US012327553B2

(12) United States Patent
Smarr et al.

(10) Patent No.: US 12,327,553 B2
(45) Date of Patent: Jun. 10, 2025

(54) ENABLING NATURAL CONVERSATIONS FOR AN AUTOMATED ASSISTANT

(71) Applicant: GOOGLE LLC, Mountain View, CA (US)

(72) Inventors: Joseph Smarr, Half Moon Bay, CA (US); David Eisenberg, Mountain View, CA (US); Hugo Santos, Zurich (CH); David Elson, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 429 days.

(21) Appl. No.: 17/537,122

(22) Filed: Nov. 29, 2021

(65) Prior Publication Data

US 2022/0366905 A1 Nov. 17, 2022

Related U.S. Application Data

(60) Provisional application No. 63/189,472, filed on May 17, 2021.

(51) Int. Cl.
*G10L 15/08* (2006.01)
*G10L 13/02* (2013.01)
(Continued)

(52) U.S. Cl.
CPC .............. *G10L 15/22* (2013.01); *G10L 13/02* (2013.01); *G10L 15/1815* (2013.01);
(Continued)

(58) Field of Classification Search
CPC .............. G10L 15/22; G10L 2015/223; G10L 15/1815; G10L 15/19; G10L 15/18;
(Continued)

(56) References Cited

U.S. PATENT DOCUMENTS 10,102,844 B1 * 10/2018 Mois ................... G06F 16/3329
10,204,627 B2 * 2/2019 Nitz ......................... G10L 15/22
(Continued)

FOREIGN PATENT DOCUMENTS

JP  2002287793  10/2002
JP  2017021125  1/2017
(Continued)

OTHER PUBLICATIONS

European Patent Office; International Search Report and Written Opinion issued in Application No. PCT/US2021/061466; 12 pages; dated May 17, 2022.
(Continued)

*Primary Examiner* — Olujimi A Adesanya
(74) *Attorney, Agent, or Firm* — Gray Ice Higdon

(57) ABSTRACT

As part of a dialog session between a user and an automated assistant, implementations can process, using a streaming ASR model, a stream of audio data to generate ASR output, process, using an NLU model, the ASR output to generate NLU output, and generate, based on the NLU output, a stream of fulfillment data. Further, implementations can further determine, based on processing the stream of audio data, audio-based characteristics associated with spoken utterance(s) captured in the stream of audio data. Based on a current state of the stream of NLU output, the stream of fulfillment data, and the audio-based characteristics, implementations can determine whether a next interaction state to be implemented is: (i) causing fulfillment output to be implemented; (ii) causing natural conversation output to be audibly rendered; or (iii) refrain from causing any interaction to be implemented, can cause the next interaction state to be implemented.

18 Claims, 9 Drawing Sheets

(51) Int. Cl.
    *G10L 15/18*    (2013.01)
    *G10L 15/22*    (2006.01)
    *G10L 15/30*    (2013.01)
    *G10L 15/32*    (2013.01)
    *G10L 25/78*    (2013.01)

(52) U.S. Cl.
    CPC .............. *G10L 15/30* (2013.01); *G10L 15/32* (2013.01); *G10L 25/78* (2013.01)

(58) Field of Classification Search
    CPC ... G10L 15/08; G10L 15/1822; G10L 15/222; G10L 15/16; G10L 15/30; G10L 15/26; G10L 15/063; G10L 2015/088; G10L 25/78; G10L 2015/228; G10L 15/00; G10L 2015/225; G10L 2015/226; G06F 40/30; G06F 3/167; G06F 40/56; G06F 16/90332; G06F 16/248; G06F 16/9535; G06F 40/20; G06F 16/3329; G06F 16/90335
    See application file for complete search history.

(56) References Cited

U.S. PATENT DOCUMENTS

| | | | |
|---|---|---|---|
| 10,255,921 B2* | 4/2019 | Elson | G10L 17/22 |
| 10,832,005 B1 | 11/2020 | Mohajer et al. | |
| 11,132,509 B1* | 9/2021 | Pasko | G06F 18/214 |
| 2014/0164532 A1* | 6/2014 | Lynch | H04L 12/1818 709/206 |
| 2014/0172840 A1* | 6/2014 | Kumar | G06F 16/248 707/723 |
| 2016/0203002 A1* | 7/2016 | Kannan | G06F 3/162 715/708 |
| 2018/0068660 A1 | 3/2018 | Kawahara | |
| 2018/0096283 A1* | 4/2018 | Wang | G06Q 10/063112 |
| 2018/0096284 A1* | 4/2018 | Stets | G06Q 10/063112 |
| 2018/0096675 A1* | 4/2018 | Nygaard | G10L 13/04 |
| 2018/0130462 A1 | 5/2018 | Kayama | |
| 2018/0133900 A1* | 5/2018 | Breazeal | B25J 19/026 |
| 2018/0212904 A1* | 7/2018 | Smullen | H04L 69/14 |
| 2018/0232436 A1* | 8/2018 | Elson | G06F 40/30 |
| 2018/0232662 A1* | 8/2018 | Solomon | G06F 3/04842 |
| 2018/0268391 A1* | 9/2018 | Hayashi | G06Q 10/06 |
| 2018/0286391 A1* | 10/2018 | Carey | G10L 15/22 |
| 2019/0132436 A1* | 5/2019 | Jang | G06F 16/951 |
| 2019/0295544 A1 | 9/2019 | Garcia et al. | |
| 2020/0097496 A1* | 3/2020 | Alexander | G06F 16/355 |
| 2020/0118568 A1 | 4/2020 | Kudurshian et al. | |
| 2020/0210649 A1* | 7/2020 | Lewis | G06F 40/35 |
| 2020/0335128 A1* | 10/2020 | Sheeder | G10L 15/04 |
| 2022/0067767 A1* | 3/2022 | Carbune | H04L 67/303 |
| 2022/0115001 A1* | 4/2022 | Bratt | G10L 15/22 |
| 2023/0053341 A1* | 2/2023 | Konzelmann | G06N 20/00 |
| 2024/0312460 A1* | 9/2024 | Konzelmann | G08B 5/36 |

FOREIGN PATENT DOCUMENTS

| | | |
|---|---|---|
| JP | 2018040897 | 3/2018 |
| JP | 2018087847 | 6/2018 |
| JP | 2019535037 | 12/2019 |
| WO | 2018067404 | 4/2018 |
| WO | 2020171809 | 8/2020 |

OTHER PUBLICATIONS

Japanese Patent Office; Notice of Reasons for Rejection issued in Application No. 2023-518288; 15 pages; dated Jun. 24, 2024.
European Patent Office, Summons issued in Application No. 21841050.4; 7 pages; dated Aug. 22, 2024.
European Patent Office; Communication pursuant to Article 94(3) EPC issued in Application No. 21841050.4, 6 pages; dated Feb. 5, 2024.
European Patent Office; Brief Communication issued in Application No. 21841050.4; 7 pages; dated Jan. 20, 2025.

* cited by examiner

ENABLING NATURAL CONVERSATIONS FOR AN AUTOMATED ASSISTANT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). Automated assistants typically rely upon a pipeline of components in interpreting and responding to spoken utterances. For example, an automatic speech recognition (ASR) engine can process audio data that correspond to a spoken utterance of a user to generate ASR output, such as speech hypotheses (i.e., sequence of term(s) and/or other token(s)) of the spoken utterance. Further, a natural language understanding (NLU) engine can process the ASR output (or touch/typed input) to generate NLU output, such as an intent of the user in providing the spoken utterance (or the touch/typed input) and optionally slot value(s) for parameter(s) associated with the intent. Moreover, a fulfillment engine can be used to process the NLU output, and to generate fulfillment output, such as a structured request to obtain responsive content to the spoken utterance and/or perform an action responsive to the spoken utterance.

Generally, a dialog session with an automated assistant is initiated by a user providing a spoken utterance, and the automated assistant can respond to the spoken utterance using the aforementioned pipeline of components to generate a response. The user can continue the dialog session by providing an additional spoken utterance, and the automated assistant can respond to the additional spoken utterance using the aforementioned pipeline of components to generate an additional response. Put another way, these dialog sessions are generally turn-based in that the user takes a turn in the dialog session to provide a spoken utterance, and the automated assistant takes a turn in the dialog session to respond to the spoken utterance. However, these turn-based dialog sessions, from a perspective of the user, may not be natural since they do not reflect how humans actually converse with one another.

For example, a first human may provide multiple disparate spoken utterances to convey a single thought to a second human, and the second human can consider each of the multiple disparate spoken utterances in formulating a response to the first human. In some instances, the first human may pause for varying amounts of time between these multiple disparate utterances. Notably, the second human may not be able to fully formulate the response to the first human simply based on a first spoken utterance, of the multiple disparate spoken utterances, or each of the multiple disparate spoken utterances in isolation.

Similarly, in these turn-based dialog sessions, the automated assistant may not be able to fully formulate a response to a given spoken utterance of a user without considering a context of the given spoken utterance with respect to multiple disparate spoken utterances. As a result, these turn-based dialog sessions can be prolonged as the user attempts to convey his/her thoughts to the automated assistant in a single spoken utterance during a single turn of these turn-based dialog sessions, thereby wasting computational resources. Further, if the user attempts to convey his/her thoughts to the automated assistant in multiple spoken utterances during a single turn of these turn-based dialog sessions, the automated assistant may simply fail, thereby also wasting computational resources. For example, the automated assistant may, when the user provides a long pause in attempting to formulate a spoken utterance, prematurely conclude the user is done speaking, process the incomplete spoken utterance, and fail as a result of determining (from the processing) that no meaningful intent is conveyed by the incomplete spoken utterance. Additionally, turn-based dialog sessions can prevent a spoken utterance of a user, provided during rendering of an assistant response, from being meaningfully processed. This can require the user to await completion of rendering of the assistant response before providing the spoken utterance, thereby prolonging the dialog session.

SUMMARY

Implementations described herein are directed to enabling an automated assistant to perform natural conversations with a user during a dialog session. Some implementations can process, using a streaming automatic speech recognition (ASR) model, a stream of audio data generated by microphone(s) of a client device of the user to generate a stream of ASR output. The stream of audio data can capture one or more spoken utterances of the user that are directed to an automated assistant implemented at least in part at the client device. Further, the ASR output can be processed, using a natural language understanding (NLU) model, to generate a stream of NLU output. Moreover, the NLU output can be processed, using one or more fulfillment rules and/or one or more fulfillment models, to generate a stream of fulfillment data. Additionally, audio-based characteristics associated with one or more of the spoken utterances can be determined based on processing the stream of audio data. Based on a current state of the stream of NLU output, the stream of fulfillment data, and/or the audio-based characteristics, a next interaction state to be implemented during the dialog session can be determined. The next interaction state to be implement during the dialog session can be one of: (i) causing fulfillment output, that is generated based on the stream of fulfillment data, to be implemented, (ii) causing natural conversation output to be audibly rendered for presentation to the user, or (iii) refraining from causing any interaction to be implemented. The next interaction state can be implemented in furtherance of the dialog session. Further, determining the next interaction state can occur iteratively during the dialog session (e.g., continuously at 10 Hz, 20 Hz or other frequency), with each iteration being based on a respective current state of NLU output, fulfillment data, and audio-based characteristics—and without awaiting the completion of a user or automated assistant response. Accordingly, by determining the next interaction state using techniques described herein during the dialog session, the automated assistant can determine whether to implement the next interaction state, and how to implement the next interaction state in furtherance of the dialog session, rather than simply responding to the user after the user provides a spoken utterance as in turn-based dialog sessions.

For example, assume that a user is engaged in a dialog session with an automated assistant and provides a spoken utterance of "turn on the . . . the uhmmm . . . ". As the user provides the spoken utterance, the stream of ASR output, the stream of NLU output, and the stream of fulfillment data can be generated based on processing the stream of audio data that captures the spoken utterance. Notably, in this example, the stream of NLU output may indicate the user intends to cause some software application (e.g., a music software application, a video software application, etc.) or some device (e.g., a client device, a smart appliance, a smart television, a smart speaker, etc.) to be controlled, but that the user has not yet identified what exactly is intended by "turn on". Nonetheless, the stream of fulfillment data can be processed to generate a set of fulfillment outputs. Moreover, the audio-based characteristics associated with the spoken utterance can be generated based on processing the stream of audio data, and can include, for example, an intonation and speech cadence that indicates the user is unsure what exactly is intended by "turn on", a duration of time that has elapsed between "turn on the" and "the uhmmm", a duration of time that has elapsed since "the uhmmm" and/or other audio-based characteristics. Further, the stream of NLU output and the audio-based characteristics can be processed to generate a set of natural conversation outputs.

In this example, the current state of the stream of NLU output, the stream of fulfillment data, and the audio-based characteristics associated with the spoken utterance can be determined. For instance, the stream of the NLU output, the stream of fulfillment data, and the audio-based characteristics can be processed, using a classification machine learning (ML) model, to generate predicted measures (e.g., binary values, probabilities, log-likelihoods, etc.). Each of the next interaction states can be associated with a corresponding one of the predicted measures, such that the automated assistant can determine whether to (i) cause fulfillment output to be implemented, (ii) cause natural conversation output to be audibly rendered for presentation to the user, or (iii) refrain from causing any interaction to be implemented. In this instance, if the automated assistant determines to (i) cause the fulfillment output to be implemented, the automated assistant can select a fulfillment output from among the plurality of fulfillment outputs and cause it to be implemented (e.g., an assistant command associated with turning on a television, turning on lights, turning on music, etc.). Further, if the automated assistant determines to (ii) cause natural conversation output to be audibly rendered for presentation to the user, the automated assistant can select a natural conversation output from among the plurality of natural conversation outputs and cause it to be audibly rendered (e.g., "What would you like me to turn on?", "Are you still there?", etc.). Moreover, if the automated assistant determines to (iii) refrain from causing any interaction to be implemented, the automated assistant can continue processing the stream of audio data.

In this example, further assume that a current instance of time of the dialog session corresponds to two second after the user finished providing "the uhmmm" portion of the spoken utterance "turn on the ... the uhmmm ... "). For the current instance of time, the corresponding predicted measures associated with the next interaction state may indicate that the automated assistant should refrain from causing any interaction to be implemented. Put another way, even though it appears the user is temporarily done speaking, the automated assistant has not determined any fulfillment output to implement with sufficient confidence and should provide additional time for the user to gather his/her thoughts and to identify what exactly it is that he/she intends to be turned on. However, further assume an additional five seconds pass. At this subsequent instance of time, the audio-based characteristics may indicate that seven seconds have elapsed since the user last spoke, and the current state can be updated based on at least the audio-based characteristics. Accordingly, for this subsequent instance of time, the corresponding predicted measures associated with the next interaction state may indicate that the automated assistant should cause natural conversation output of "What do you want me to turn on?" to be audibly rendered for presentation to the user to re-engage the user in the dialog session. Put another way, even though the user is done speaking and the automated assistant has still not determined any fulfillment output to implement with sufficient confidence, the automated assistant can prompt the user in furtherance of the dialog session and circling back to what the user had previously indicated he/she wanted to do (e.g., turn something on). Moreover, further assume that the user provides an additional spoken utterance of "oh, the television". At this further subsequent instance of time, the streams of data may be updated to indicate that the user intends to cause the television to be turned on, and the current state can be updated based on the updated streams of data. Accordingly, for this further subsequent instance of time, the corresponding predicted measures associated with the next interaction state may indicate that the automated assistant should cause the television to be turned on (and optionally cause synthesized speech to be audibly rendered that indicates the automated assistant will cause the television to be turned on). Put another way, at this further subsequent time instance, the automated assistant has determined the fulfillment output with sufficient confidence to be implemented.

In some implementations, the stream of NLU data can be processed by a plurality of agents to generate the stream of fulfillment data. The set of fulfillment outputs can be generated based on the stream of fulfillment data, and the fulfillment outputs can be selected from the set of fulfillment outputs based on predicted NLU measures associated with the stream of NLU data and/or predicted fulfillment measures associated with the stream of fulfillment data. In some implementations, only one fulfillment output may be implemented as the next interaction state, whereas in other implementations, multiple fulfillment outputs may be implemented as the next interaction state. As used herein, "first-party" (1P) agents, devices, and/or systems reference agents, devices, and/or systems that are controlled by a party that is the same as the party that controls the automated assistant referenced herein. In contrast, "third-party" (3P) agents, devices, and/or system reference agents, devices, and/or systems that are controlled by a party that is distinct from the party that controls the automated assistant referenced herein, but that can be communicatively coupled to one or more 1P agents, devices, and/or systems.

In some versions of those implementations, the plurality of agents include one or more 1P agents. Continuing with the above example, at the current instance of time of the dialog session (e.g., two seconds after the user finished providing "the uhmmm" portion of the spoken utterance "turn on the ... the uhmmm ... "), the stream of fulfillment data can be processed by a 1P music agent to generate fulfillment output associated with an assistant command that, when implemented, causes music to be turned on, a 1P video streaming service agent to generate fulfillment output associated with an assistant command that, when implemented, causes a video streaming service to be turned on, a 1P smart device agent to generate fulfillment output associated with an assistant command that, when implemented, causes one or more 1P smart devices to be controlled, and so on. In this example, the stream of fulfillment data can be transmitted to the 1P agents via an application programming interface (API). In additional or alternative versions of those implementations, the plurality of agents include one or more 3P agents. The fulfillment outputs generated by the 3P agents can be similar to those generated by the 1P agents, but generated by the 3P agents. In this example, the stream of fulfillment data can be transmitted to the 3P agents via an application programming interface (API) and over one or more networks, and the 3P agents can transmit the fulfillment outputs back to the client device. Each of the fulfillment outputs generated by the plurality of agents (e.g., the 1P agents and/or the 3P agents) can be aggregated as the set of the fulfillment outputs.

Although the above example is described with respect to the set of fulfillment outputs of assistant commands, it should be understood that is for the sake of example and is not meant to be limiting. In some implementations, the set of fulfillment outputs can additionally or alternatively include instances of synthesized speech audio data that include corresponding synthesized speech, and that can be audibly rendered for presentation to the user via one or more of the speakers of the client device. For example, assume the user instead provided a spoken utterance during the dialog session of "set a timer for 15 minutes". Further assume that predicted measures associated with the stream of NLU data and/or predicted measures associated with the stream of fulfillment data indicate that the user either said 15 minutes or 50 minutes. In this example, the stream of fulfillment data can be processed by a 1P timer agent to generate first fulfillment output associated with a first assistant command to set a timer for 15 minutes, second fulfillment output associated with a second assistant command to set a timer for 50 minutes, a third fulfillment output associated with a first instance of synthesized speech audio data that confirms the assistant command to be performed (e.g., "the timer is set for 15 minutes"), a fourth fulfillment output associated with a first instance of synthesized speech audio data that requests the user disambiguate the assistant command to be performed (e.g., "is that timer for 15 minutes or 50 minutes?"), and so on.

In this example, the automated assistant can select one or more of the fulfillment outputs from among the set of fulfillment outputs to be implemented based on the predicted NLU measures associated with the stream of NLU data and/or the predicted fulfillment measures associated with the stream of fulfillment data. For instance, assume the predicted measures satisfy both a first threshold measure and a second threshold measure and that indicates a very high confidence the user said "set a timer for 15 minutes". In this example, the automated assistant can cause the first fulfillment output associated with the first assistant command to set a timer for 15 minutes to be implemented, and without causing any instances of synthesized speech to be audibly rendered for presentation to the user. In contrast, assume the predicted measures satisfy the first threshold measure, but not the second threshold measure and that indicates a mild confidence the user said "set a timer for 15 minutes". In this example, the automated assistant can cause the first fulfillment output associated with the first assistant command to set a timer for 15 minutes to be implemented, and also cause the third fulfillment output associated with the first instance of synthesized speech audio data that confirms the assistant command to be performed to be implemented (e.g., "the timer is set for 15 minutes"). This provides an opportunity for the user to correct the automated assistant if incorrect. However, assume the predicted measures fail to satisfy both the first threshold measure and the second threshold measure and that indicates a low confidence the user said "set a timer for 15 minutes". In this example, the automated assistant can cause the fourth fulfillment output associated with a first instance of synthesized speech audio data that requests the user disambiguate the assistant command to be performed (e.g., "is that timer for 15 minutes or 50 minutes?"), and the automated assistant can refrain from setting any timer due to the low confidence.

In some implementations, the set of fulfillment outputs can additionally or alternatively include instances of graphical content that can be visually rendered for presentation to the user via a display of the client device or an additional client device in communication with the client device. Continuing with the above timer example, the stream of fulfillment data can be processed by a 1P timer agent to additionally or alternatively generate fifth fulfillment output associated with first graphical content that depicts a timer set for 15 minutes, and sixth fulfillment output associated with second graphical content that depicts a timer set for 50 minutes. Similarly, the automated assistant can select one or more of the fulfillment outputs from among the set of fulfillment outputs to be implemented based on the predicted NLU measures associated with the stream of NLU data and/or the predicted fulfillment measures associated with the stream of fulfillment data. For instance, assume the predicted measures satisfy the first threshold measure and/or the second threshold measure and that indicates a very high and/or mild confidence the user said "set a timer for 15 minutes". In this example, the automated assistant can additionally or alternatively cause the fifth fulfillment output associated with the first graphical content that depicts a timer set for 15 minutes to be implemented, such that the graphical depiction of the timer set to 15 minutes is visually rendered for presentation to the user. In contrast, assume the predicted measures fail to satisfy both the first threshold measure and the second threshold measure and that indicates a low confidence the user said "set a timer for 15 minutes". In this example, the automated assistant can additionally or alternatively cause the fifth fulfillment output associated with the first graphical content that depicts a timer set for 15 minutes to be implemented and the sixth fulfillment output associated with the second graphical content that depicts a timer set for 50 minutes to be implemented, such that the graphical depiction of the timer set to 15 minutes, and another graphical depiction of the timer set to 50 minutes are both visually rendered for presentation to the user. Accordingly, even when the next interaction state indicates that the fulfillment output should be implemented, the fulfillment output can be dynamically determined based on the current state.

In some implementations, the automated assistant can cause fulfillment outputs in the set of fulfillment outputs to be partially fulfilled prior to determining the next interaction state causing the fulfillment output to be implemented. As noted above with respect to the initial example where the user provided the spoken utterance "turn on the . . . the uhmmm . . . ", the set of fulfillment outputs generated by the plurality of agents can include fulfillment output associated with an assistant command that, when implemented, causes music to be turned on, fulfillment output associated with an assistant command that, when implemented, causes a video streaming service to be turned on, fulfillment output associated with an assistant command that, when implemented, causes one or more 1P smart devices to be controlled, and so on. In this example, the automated assistant can preemptively establish a connection with software applications (e.g., a music application, a video streaming application) and/or smart devices (e.g., a smart television, a smart appliance, etc.) in anticipation of the user requesting the automated assistant perform some action to be performed with respect to the software applications and/or the smart devices. As a result, latency in causing the fulfillment output to be implemented as the next interaction state can be reduced.

In some implementations, the set of natural conversation outputs can be generated based on the NLU measures associated with the stream of NLU data and/or the audio-based characteristics, and the natural conversation output can be selected from among the set of the natural conversation outputs. In some versions of those implementations, a superset of natural conversation outputs can be stored in one or more databases accessible by the client device, and the set of natural conversation outputs can be generated from the superset of natural conversation outputs based on the NLU measures associated with the stream of NLU data and/or the audio-based characteristics. These natural conversation outputs can be implemented as the next interaction state in furtherance of the dialog session, but are not necessarily implemented as fulfillment. For example, the natural conversation output can include request the user confirm an indication of a desire to continue interacting with the automated assistant (e.g., "Are you still there?", etc.), request that the user provide additional user input in furtherance of a dialog session between the user and the automated assistant (e.g., "What did you want to turn on?", etc.), filler speech (e.g., "Sure", "Alright", etc.).

In some implementations, even though the next interaction state to be implemented is refraining from causing interaction to be implemented, the stream of audio data can still be processed using the ASR model to update the stream of ASR output, the stream of NLU output, and the stream of fulfillment data. Accordingly, the current state can be iteratively updated, such that determining the next interaction state can also occur iteratively during the dialog session. In some versions of those implementations, the automated assistant can additionally or alternatively process the stream of audio data using a voice activity detection (VAD) model to monitor for occurrences of voice activity (e.g., after the user has been silent for a few seconds). In these implementations, the automated assistant can determine whether a detected occurrence of voice activity is directed to an automated assistant. For example, the updated stream of NLU data can indicate whether this detected voice activity is directed to the automated assistant. If so, the automated assistant can continue updating the stream of fulfillment data and the set of fulfillment outputs.

In some implementations, the current state of the stream of NLU output, the stream of fulfillment data, and the audio-based characteristics includes a most recent instance of the NLU output generated based on a most recent spoken utterance of the one or more spoken utterances, a most recent instance of the fulfillment data generated based on the most recent NLU output, and a most recent instance of the audio-based characteristics generated based on the most recent spoken utterance. Continuing with the above example, at the current instance of time of the dialog session (e.g., two seconds after the user finished providing "the uhmmm" portion of the spoken utterance "turn on the . . . the uhmmm . . ."), the current state may only correspond to the NLU data, fulfillment data, and audio-based characteristics generated based on "the uhmmm" portion of the spoken utterance. In additional or alternative implementations, the current state of the stream of NLU output, the stream of fulfillment data, and the audio-based characteristics further includes one or more historical instances of the NLU output generated based on one or more historical spoken utterances that precede the most recent spoken utterance, one or more historical instances of the fulfillment data generated based on the one or more historical instances of the NLU output, and one or more historical instances of the audio-based characteristics generated based on the one or more historical spoken utterances. Continuing with the above example, at the current instance of time of the dialog session (e.g., two seconds after the user finished providing "the uhmmm" portion of the spoken utterance "turn on the . . . the uhmmm . . ."), the current state may only correspond to the NLU data, fulfillment data, and audio-based characteristics generated based on "the uhmmm" portion of the spoken utterance, "turn on the" portion of the spoken utterance, and optionally any spoken utterances that occur prior to the "turn on the" portion of the spoken utterance.

By using the techniques described herein, one or more technical advantages can be achieved. As one non-limiting example, the techniques described herein enable the automated assistant to engage in natural conversations with a user during a dialog session. For instance, the automated assistant can determine a next interaction state for the dialog session based on a current state of the dialog session, such that the automated assistant is not limited to turn-based dialog sessions or dependent on determining that a user is done speaking before responding to the user. Accordingly, the automated assistant can determine when to respond to a user and how to respond to the user as the user engages in these natural conversations. This results in various technical advantages that conserve computational resources at a client device, and can cause dialog sessions to be concluded in a quicker and more efficient manner. For instance, a quantity of occurrences of the automated assistant failing can be reduced since the automated assistant can wait for more information from the user prior to attempting to perform any fulfillment on behalf of the user. Also, for instance, a quantity of user inputs received at the client device can be reduced since a quantity of occurrences of the user having to repeat themselves or re-invoke the automated assistant can be reduced.

As used herein, a "dialog session" may include a logically-self-contained exchange between a user and automated assistant (and in some cases, other human participants). The automated assistant may differentiate between multiple dialog sessions with the user based on various signals, such as passage of time between sessions, change of user context (e.g., location, before/during/after a scheduled meeting, etc.) between sessions, detection of one or more intervening interactions between the user and the client device other than dialog between the user and the automated assistant (e.g., the user switches applications for a while, the user walks away from then later returns to a standalone voice-activated product), locking/sleeping of the client device between sessions, change of client devices used to interface with the automated assistant, and so forth.

The above description is provided as an overview of only some implementations disclosed herein. Those implementations, and other implementations, are described in additional detail herein.

It should be understood that techniques disclosed herein can be implemented locally on a client device, remotely by server(s) connected to the client device via one or more networks, and/or both.

DETAILED DESCRIPTION

Figure 1:
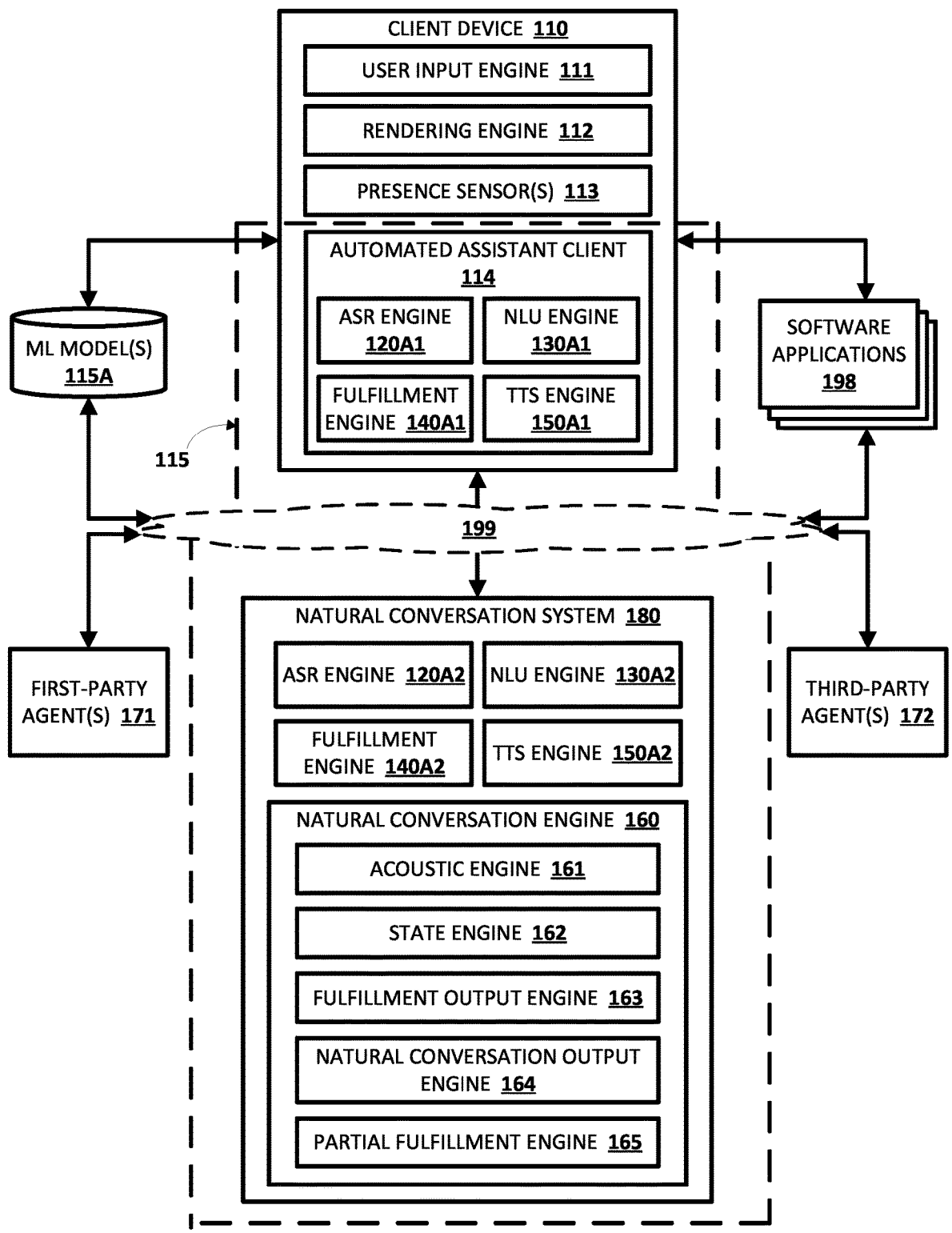
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a natural conversation system 180. In some implementations, the natural conversation system 180 can be implemented locally at the client device 110. In additional or alternative implementations, the natural conversation system 180 can be implemented remotely from the client device 110 as depicted in FIG. 1. In these implementations, the client device 110 and the natural conversation system 180 may be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an automated assistant client 114. An instance of the automated assistant client 114 can be an application that is separate from an operating system of the client device 110 (e.g., installed "on top" of the operating system)—or can alternatively be implemented directly by the operating system of the client device 110. The automated assistant client 114 can interact with the natural conversation system 180 implemented locally at the client device 110 or via one or more of the networks 199 as depicted in FIG. 1. The automated assistant client 114 (and optionally by way of its interactions with other remote system (e.g., server(s))) may form what appears to be, from a user's perspective, a logical instance of an automated assistant 115 with which the user may engage in a human-to-computer dialog. An instance of the automated assistant 115 is depicted in FIG. 1, and is encompassed by a dashed line that includes the automated assistant client 114 of the client device 110 and the natural conversation system 180. It thus should be understood that a user that engages with the automated assistant client 114 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 114 executing locally on the client device 110 and/or one or more servers that may implement the natural conversation system 180.

In various implementations, the client device 110 may include a user input engine 111 that is configured to detect user input provided by a user of the client device 110 using one or more user interface input devices. For example, the client device 110 may be equipped with one or more microphones that capture audio data, such as audio data corresponding to spoken utterances of the user or other sounds in an environment of the client device 110. Additionally, or alternatively, the client device 110 may be equipped with one or more vision components that are configured to capture vision data corresponding to images and/or movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

In various implementations, the client device 110 may include a rendering engine 112 that is configured to provide content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or projector that enables content to be provided for visual presentation to the user via the client device 110.

In various implementations, the client device 110 may include one or more presence sensors 113 that are configured to provide, with approval from corresponding user(s), signals indicative of detected presence, particularly human presence. In some of those implementations, the automated assistant 115 can identify the client device 110 (or another computing device associated with a user of the client device 110) to satisfy a spoken utterance based at least in part of presence of the user at the client device 110 (or at another computing device associated with the user of the client device 110). The spoken utterance can be satisfied by rendering responsive content (e.g., via the rendering engine 112) at the client device 110 and/or other computing device(s) associated with the user of the client device 110, by causing the client device 110 and/or other computing device(s) associated with the user of the client device 110 to be controlled, and/or by causing the client device 110 and/or other computing device(s) associated with the user of the client device 110 to perform any other action to satisfy the spoken utterance. As described herein, the automated assistant 115 can leverage data determined based on the presence sensors 113 in determining the client device 110 (or other computing device(s)) based on where a user is near or was recently near, and provide corresponding commands to only the client device 110 (or those other computing device(s)). In some additional or alternative implementations, the automated assistant 115 can leverage data determined based on the presence sensors 113 in determining whether any user(s) (any users or specific users) are currently proximal to the client device 110 (or other computing device(s)), and can optionally suppress provision of data to and/or from the client device 110 (or other computing device(s)) based on the user(s) that are proximal to the client device 110 (or other computing device(s)).

The presence sensors 113 may come in various forms. For example, the client device 110 can utilize one or more of the user interface input components described above with respect to the user input engine 111 to detect presence of the user. Additionally, or alternatively, the client device 110 may be equipped with other types of light-based presence sensors 113, such as passive infrared ("PIR") sensors that measure infrared ("IR") light radiating from objects within their fields of view.

Additionally, or alternatively, in some implementations, the presence sensors 113 may be configured to detect other phenomena associated with human presence or device presence. For example, in some embodiments, the client device 110 may be equipped with a presence sensor 113 that detects various types of wireless signals (e.g., waves such as radio, ultrasonic, electromagnetic, etc.) emitted by, for instance, other computing devices carried/operated by a user (e.g., a mobile device, a wearable computing device, etc.) and/or other computing devices. For example, the client device 110 may be configured to emit waves that are imperceptible to humans, such as ultrasonic waves or infrared waves, that may be detected by other computing device(s) (e.g., via ultrasonic/infrared receivers such as ultrasonic-capable microphones).

Additionally, or alternatively, the client device 110 may emit other types of human-imperceptible waves, such as radio waves (e.g., Wi-Fi, Bluetooth, cellular, etc.) that may be detected by other computing device(s) carried/operated by a user (e.g., a mobile device, a wearable computing device, etc.) and used to determine the user's particular location. In some implementations, GPS and/or Wi-Fi triangulation may be used to detect a person's location, e.g., based on GPS and/or Wi-Fi signals to/from the client device 110. In other implementations, other wireless signal characteristics, such as time-of-flight, signal strength, etc., may be used by the client device 110, alone or collectively, to determine a particular person's location based on signals emitted by the other computing device(s) carried/operated by the user.

Additionally, or alternatively, in some implementations, the client device 110 may perform speaker identification (SID) to recognize a user from their voice. In some implementations, movement of the speaker may then be determined, e.g., by the presence sensors 113 of the client device 110 (and optionally GPS sensors, Soli chips, and/or accelerometers of the client device 110). In some implementations, based on such detected movement, a location of the user may be predicted, and this location may be assumed to be the user's location when any content is caused to be rendered at the client device 110 and/or other computing device(s) based at least in part on proximity of the client device 110 and/or other computing device(s) to the user's location. In some implementations, the user may simply be assumed to be in the last location at which he or she engaged with the automated assistant 115, especially if not much time has passed since the last engagement.

Further, the client device 110 and/or the natural conversation system 180 may include one or more memories for storage of data and/or software applications 198, one or more processors for accessing data and executing the software applications 198, and/or other components that facilitate communication over one or more of the networks 199. In some implementations, one or more of the software applications 198 can be installed locally at the client device 110, whereas in other implementations one or more of the software applications 198 can be hosted remotely (e.g., by one or more servers) and can be accessible by the client device 110 over one or more of the networks 199. The operations performed by the client device 110, other computing device(s), and/or by the automated assistant 115 may be distributed across multiple computer systems. The automated assistant 115 may be implemented as, for example, computer programs running on the client device 110 and/or one or more computers in one or more locations that are coupled to each other through a network (e.g., the network(s) 199 of FIG. 1).

In some implementations, the operations performed by the automated assistant 115 may be implemented locally at the client device 110 via the automated assistant client 114. As shown in FIG. 1, the automated assistant client 114 may include an automatic speech recognition (ASR) engine 120A1, a natural language understanding (NLU) engine 130A1, a fulfillment engine 140A1, and a text-to-speech (US) engine 150A1. In some implementations, the operations performed by the automated assistant 115 may be distributed across multiple computer systems, such as when the natural conversation system 180 is implemented remotely from the client device 110 as depicted in FIG. 1. In these implementations, the automated assistant 115 may additionally or alternatively utilize ASR engine 120A2, NLU engine 130A2, fulfillment engine 140A2, and US engine 150A2 of the natural conversation system 180.

Each of these engines may be configured to perform one or more functions. For example, the ASR engine 120A1 and/or 120A2 can process, using streaming ASR model(s) stored in machine learning (ML) model(s) database 115A (e.g., a recurrent neural network (RNN) model, a transformer model, and/or any other type of ML model capable of performing ASR), a stream of audio data that captures spoken utterances and that is generated by microphone(s) of the client device 110 to generate a stream of ASR output. Notably, the streaming ASR model can be utilized to generate the stream of ASR output as the stream of audio data is generated. Further, the NLU engine 130A1 and/or 130A2 can process, using NLU model(s) stored in the ML model(s) database 115A (e.g., a long short-term memory (LSTM), gated recurrent unit (GRU), and/or any other type of RNN or other ML model capable of performing NLU) and/or grammar-based rule(s), the stream of ASR output to generate a stream of NLU output. Moreover, the fulfillment engine 140A1 and/or 140A2 can generate a set of fulfillment outputs based on a stream of fulfillment data generated based on the stream of NLU output. The stream of fulfillment data can be generated using, for example, one or more first-party (1P) agents 171 and/or one or more third-party (3P) agents 171 (e.g., as described with respect to FIG. 2). Lastly, the TTS engine 150A1 and/or 150A2 can process, using TTS model(s) stored in the ML model(s) database 115A, textual data (e.g., text formulated by the automated assistant 115) to generate synthesized speech audio data that includes computer-generated synthesized speech. Notably, the ML model(s) stored in the ML model(s) database 115A can be on-device ML models that are stored locally at the client device 110 or shared ML models that are accessible to both the client device 110 and/or remote systems (e.g., server(s)).

In various implementations, the stream of ASR output can include, for example, a stream of speech hypotheses (e.g., term hypotheses and/or transcription hypotheses) that are predicted to correspond to spoken utterance(s) of a user that are captured in the stream of audio data, one or more corresponding predicted values (e.g., probabilities, log likelihoods, and/or other values) for each of the speech hypotheses, a plurality of phonemes that are predicted to correspond to spoken utterance(s) of a user that are captured in the stream of audio data, and/or other ASR output. In some versions of those implementations, the ASR engine 120A1 and/or 120A2 can select one or more of the speech hypotheses as recognized text that corresponds to the spoken utterance (e.g., based on the corresponding predicted values).

In various implementations, the stream of NLU output can include, for example, a stream of annotated recognized text that includes one or more annotations of the recognized text for one or more (e.g., all) of the terms of the recognized text. For example, the NLU engine 130A1 and/or 130A2 may include a part of speech tagger (not depicted) configured to annotate terms with their grammatical roles. Additionally, or alternatively, the NLU engine 130A1 and/or 130A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Additionally, or alternatively, the NLU engine 130A1 and/or 130A2 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 130A1 and/or 130A2 may rely on annotations from one or more other components of the NLU engine 130A1 and/or 130A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household).

As described herein, the automated assistant 115 can determine whether to determining, based on a current state of the stream of NLU output, the stream of fulfillment data, and audio-based characteristics of spoken utterance(s) captured in the stream of audio data on which the stream of NLU output and the stream of fulfillment data are generated, whether a next interaction state to be implemented during a dialog session between a user and the automated assistant 115 is (i) causing fulfillment output to be implemented, (ii) causing natural conversation output to be audibly rendered for presentation to a user, or (iii) refraining from causing any interaction to be implemented. In making this determination, the automated assistant can utilize natural conversation engine 160. In various implementations, and as depicted in FIG. 1, the natural conversation engine 160 can include an acoustic engine 161, a state engine 162, a fulfillment output engine 163, a natural conversation output engine 164, and partial fulfillment engine 165.

In some implementations, the acoustic engine 161 can determine, based on processing the stream of audio data, the audio-based characteristics. In some implementations, the acoustic engine 161 can process, using an acoustic ML model stored in the ML model(s) database 115A, the stream of audio data to determine the audio-based characteristics. In some implementations, the acoustic engine 161 can process, using one or more rules, the stream of audio data to determine the audio-based characteristics. The audio-based characteristics can include, for example, prosodic properties associated with spoken utterance(s) captured in the stream of audio data, a duration of time that has elapsed since a most recent spoken utterance was provided, and/or other audio-based characteristics. The prosodic properties can include, for example, one or more properties of syllables and larger units of speech, including linguistic functions such as intonation, tone, stress, rhythm, tempo, pitch, and pause. Further, the prosodic properties can provide an indication of, for example: emotional state; form (e.g., statement, question, or command); irony; sarcasm; speech cadence; and/or emphasis. In other words, the prosodic properties are features of speech that are independent of a given user's individual voice characteristics, and that can be dynamically determined during a dialog session based on an individual spoken utterances and/or a combination of multiple spoken utterances.

In some implementations, the state engine 162 can determine a current state of the dialog session based on the stream of the NLU output, the stream of fulfillment data, and the audio-based characteristics. Further, the state engine 162 can determine, based on the current state of the dialog session, a next interaction state to be implemented in furtherance of the dialog session. The next interaction state can include, for example, (i) causing fulfillment output to be implemented, (ii) causing natural conversation output to be audibly rendered for presentation to a user, or (iii) refraining from causing any interaction to be implemented. Put another way, the state engine 162 can analyze signals generated by various components described herein to determine the current state of the dialog, and determine, based on the current state, how to automated assistant 115 should proceed in furtherance of the dialog session. Notably, the state engine 162 can iteratively update the current state throughout the dialog session (e.g., continuously at 10 Hz, 20 Hz or other frequency) based on updates to the stream of NLU output, the stream of fulfillment data, and the audio-based characteristics—and without awaiting the completion of a user or automated assistant response. As a result, the next interaction state to be implemented can be iteratively updated such that it is continuously determined how the automated assistant 115 should proceed in furtherance of the dialog session.

In some implementations, the current state of the stream of NLU output, the stream of fulfillment data, and the audio-based characteristics includes a most recent instance of the NLU output generated based on a most recent spoken utterance of the one or more spoken utterances, a most recent instance of the fulfillment data generated based on the most recent NLU output, and a most recent instance of the audio-based characteristics generated based on the most recent spoken utterance. In additional or alternative implementations, the current state of the stream of NLU output, the stream of fulfillment data, and the audio-based characteristics further includes one or more historical instances of the NLU output generated based on one or more historical spoken utterances that precede the most recent spoken utterance, one or more historical instances of the fulfillment data generated based on the one or more historical instances of the NLU output, and one or more historical instances of the audio-based characteristics generated based on the one or more historical spoken utterances. Accordingly, the current state of the dialog session can be determined as a function of a most recent spoken utterance and/or one or more prior spoken utterances.

In various implementations, the state engine 162 can determine the next interaction state based on processing the current state of the stream of NLU output, the stream of fulfillment data, and the audio-based characteristics using a classification ML model stored in the ML model(s) database 115A. The classification ML model can generate, based on processing the current state of the stream of NLU output, the stream of fulfillment data, and the audio-based characteristics, corresponding predicted measures associated with each of the next interaction states. The classification ML model can be trained based on a plurality of training instances. Each of the training instances can include training instance input and training instance output. The training instance input can include, for example, a training state of a training stream of NLU output, training stream of fulfillment data, and training audio-based characteristics, and the training instance output can include ground truth output associated with whether the automated assistant 115 should, based on the training instance, (i) cause fulfillment output to be implemented, (ii) cause natural conversation output to be audibly rendered for presentation to a user, or (iii) refrain from causing any interaction to be implemented. The training state can be determined based on historical dialog sessions between the user and the automated assistant 115 (and/or other users and respective automated assistant), or can be heuristically defined. In training the classification ML model, the training instance can be applied as input to generate predicted output (e.g., corresponding predicted measures), and the predicted output can be compared to ground truth output to generate one or more losses. The classification ML model can be updated based on one or more of the losses (e.g., via backpropagation). Once trained, the classification ML model can be deployed for use by the state engine 162 as described herein.

In some implementations, the fulfillment output engine 163 can select one or more fulfillment outputs, from among a set of fulfillment outputs, to be implemented in response to determining the next interaction state to be implemented is (i) causing fulfillment output to be implemented. As noted above, the fulfillment engine 140A1 and/or 140A2 can generate the set of fulfillment outputs based on the stream of fulfillment data, and the stream of fulfillment data can be generated using, for example, one or more of the 1P agents 171 and/or one or more of the 3P agents 171. Although one or more of the 1P agents 171 are depicted as being implemented over one or more of the networks 199 in FIG. 1, it should be understood that is for the sake of example and is not meant to be limiting. For instance, one or more of the 1P agents 171 can be implemented locally at the client device 110, and the stream of NLU output can be transmitted to one or more of the 1P agents 171 via an application programming interface (API), and fulfillment data from one or more of the 1P agents 171 can be obtained by the fulfillment output engine 163 via the API and incorporated into the stream of fulfillment data. One or more of the 3P agents 172 can be implemented via a corresponding 3P system (e.g., 3P server(s)). The stream of NLU output can additionally or alternatively be transmitted one or more of the 3P agents 172 (and one or more of the 1P agents 171 that are not implemented locally at the client device 110) over one or more of the networks 199 to cause one or more of the 3P agents 172 to generate fulfillment data. The fulfillment data can be transmitted back to the client device 110 over one or more of the networks 199 and incorporated into the stream of fulfillment data.

Further, the fulfillment output engine 163 can select one or more fulfillment outputs, from among a set of fulfillment outputs, based on NLU measures associated with the stream of NLU data and/or fulfillment measures associated with the stream of fulfillment data. The NLU measures can be, for example, probabilities, log likelihoods, binary values, etc. that are indicative of how confident the NLU engine 130A1 and/or 130A2 is that predicted intent(s) correspond to an actual intent of a user that provided the spoken utterance(s) captured in the stream of audio data and/or how confident predicted slot value(s) for parameter(s) associated with the predicted intent(s) corresponds to actual slot value(s) for the parameter(s) associated with the predicted intent(s). The NLU measures can be generated as the NLU engine 130A1 and/or 130A2 generates the stream of NLU output, and can be included in the stream of NLU output. The fulfillment measures can be, for example, probabilities, log likelihoods, binary values, etc. that are indicative of how confident the fulfillment engine 140A1 and/or 140A2 is that predicted fulfillment output(s) correspond to a desired fulfillment of the user. The fulfillment measures can be generated as one or more of the 1P agents 171 and/or one or more of the 3P agents 172 generate the fulfillment data and can be incorporated into the stream of fulfillment data, and/or can be generated as the fulfillment engine 140A1 and/or 140A2 processes the fulfillment data received from one or more of the 1P agents 171 and/or one or more of the 3P agents 172 and can be incorporated into the stream of fulfillment data.

In some implementations, the natural conversation output engine 164 can generate a set of natural conversation outputs, and can select one or more natural conversation outputs, from among the set of natural conversation outputs, to be implemented in response to determining the next interaction state to be implemented is (ii) causing natural conversation output to be audibly rendered for presentation to a user. The set of natural conversation outputs can be generated, for example, based on the NLU measures associated with the stream of NLU data and/or the audio-based characteristics. In some versions of those implementations, a superset of natural conversation outputs can be stored in one or more databases (not depicted) accessible by the client device 110, and the set of natural conversation outputs can be generated from the superset of natural conversation outputs based on the NLU measures associated with the stream of NLU data and/or the audio-based characteristics. These natural conversation outputs can be implemented as the next interaction state in furtherance of the dialog session, but are not necessarily implemented as fulfillment. For example, the natural conversation output can include request the user confirm an indication of a desire to continue interacting with the automated assistant 115 (e.g., "Are you still there?", etc.), request that the user provide additional user input in furtherance of a dialog session between the user and the automated assistant 115 (e.g., "What did you want to turn on?", etc.), filler speech (e.g., "Sure", "Alright", etc.). In various implementations, the natural conversation engine 164 can utilize one or more language models stored in the ML model(s) database 115A in generating the set of natural conversation outputs.

In some implementations, the partial fulfillment engine 165 can cause fulfillment outputs in the set of fulfillment outputs to be partially fulfilled prior to determining the next interaction state causing the fulfillment output to be implemented. For example, the partial fulfillment engine 165 can establish a connection with one or more of the software application 198, one or more of the 1P agents 171, one or more of the 3P agents 172, an additional client device in communication with the client device 110, and/or one or more smart devices that are in communication with the client device 110 that are associated with fulfillment outputs included the set of fulfillment outputs, can cause synthesized speech audio data that includes synthesized speech to be generated (but not audibly rendered), can cause graphical content to be generated (but not visually rendered), and/or perform other partial fulfillment of one or more of the fulfillment outputs. As a result, latency in causing the fulfillment output to be implemented as the next interaction state can be reduced.

Figure 2:
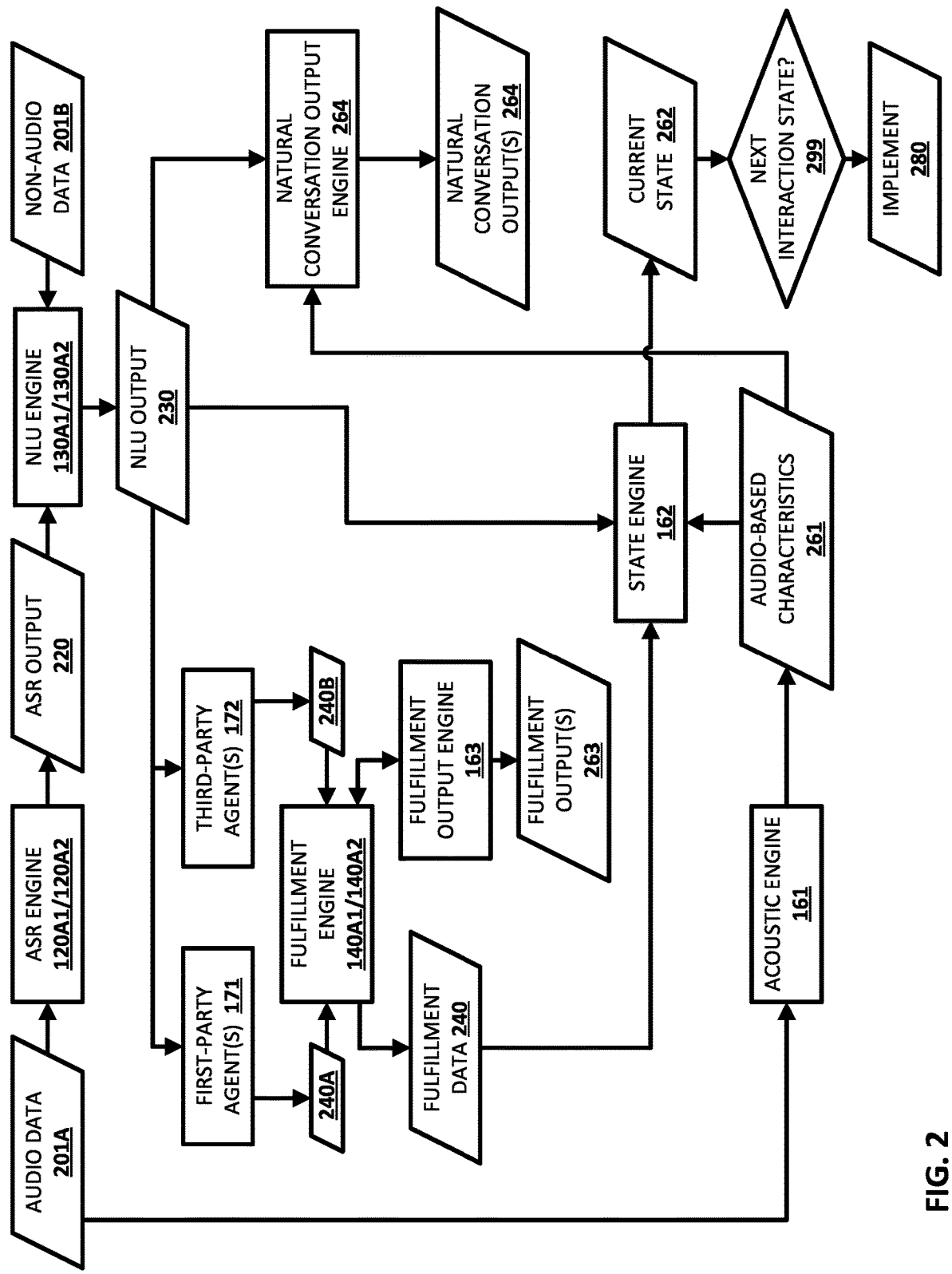
FIG. 2 depicts an example process flow that demonstrates various aspects of the present disclosure using various components of FIG. 1, in accordance with various implementations.

Turning now to FIG. 2, an example process flows that demonstrates various aspects of the present disclosure using various components of FIG. 1 is depicted. The ASR engine 120A1 and/or 120A2 can process, using a streaming ASR model stored in the ML model(s) database 115A, a stream of audio data 201A to generate a stream of ASR output 220. The NLU engine 130A1 and/or 130A2 can process the stream of ASR output 220, using an NLU model stored in the ML model(s) database 115A, to generate a stream of NLU output 230. In some implementations, the NLU engine 130A1 and/or 130A2 can additionally or alternatively process a stream of non-audio data 201B in generating the stream of NLU output 230. The stream of non-audio data 201B can include, a stream of vision data generated by vision component(s) of the client device 110, a stream of touch inputs provided by a user via a display of the client device 110, a stream of typed input provided by a user via a display of the client device 110 or a peripheral device (e.g., a mouse and keyboard), and/or any other non-audio data. In some implementations, the 1P agent(s) 171 can process the stream of NLU output to generate 1P fulfillment data 240A. In additional or alternative implementations, the 3P agent(s) 172 can process the stream of NLU output 230 to generate 3P fulfillment data 240B. The fulfillment engine 140A1 and/or 140A2 can generate a stream of fulfillment data 240 based on the 1P fulfillment data 240A and/or the 3P fulfillment data 240B. Further, the acoustic engine 161 can process the stream of audio data 201A to generate audio-based characteristics 261 associated with the stream of audio data 201A.

The state engine 162 can process the stream of NLU output 230, the stream of fulfillment data 240, and/or the audio-based characteristics to determine a current state 262, and can, as indicated at block 299, determine whether a next interaction state is: (i) causing fulfillment output to be implemented, (ii) causing natural conversation output to be audibly rendered for presentation to the user, or (iii) refraining from causing any interaction to be implemented. For instance, the stream of the NLU output 230, the stream of fulfillment data 240, and the audio-based characteristics 241 can be processed, using a classification ML model, to generate predicted measures (e.g., binary values, probabilities, log-likelihoods, etc.). Each of the next interaction states can be associated with a corresponding one of the predicted measures, such that the state engine 162 can determine whether to (i) cause fulfillment output to be implemented based on a first corresponding predicted measure of the predicted measures, (ii) cause natural conversation output to be audibly rendered for presentation to the user based on a second corresponding predicted measure of the predicted measures, or (iii) refrain from causing any interaction to be implemented based on a third corresponding predicted measure of the predicted measures.

In this instance, if the state engine 162 determines to (i) cause the fulfillment output to be implemented based on the first corresponding predicted measure, the fulfillment output engine 163 can select one or more fulfillment outputs 263, from among a set of fulfillment outputs, and the one or more fulfillment outputs 263 can be implemented as indicated by 280. Further, in this instance, if the state engine 162 determines to (ii) cause natural conversation output to be audibly rendered for presentation to the user based on the second corresponding predicted measure, the natural conversation output engine 164 can select one or more natural conversation outputs 264, from among a set of natural conversation outputs, and the one or more natural conversation outputs 264 can be audibly rendered for presentation to the user as indicated by 280. Moreover, in this instance, if the state engine 162 determines to (iii) refrain from causing any interaction to be implemented based on the third corresponding predicted measure, the automated assistant 115 can refrain from implementing any interaction as indicated by 280. Although a particular implementation is described with respect to the process flow of FIG. 2, it should be understood that is for the sake of example and is not meant to be limiting.

By using the techniques described herein, one or more technical advantages can be achieved. As one non-limiting example, the techniques described herein enable the automated assistant to engage in natural conversations with a user during a dialog session. For instance, the automated assistant can determine a next interaction state for the dialog session based on a current state of the dialog session, such that the automated assistant is not limited to turn-based dialog sessions or dependent on determining that a user is done speaking before responding to the user. Accordingly, the automated assistant can determine when to respond to a user and how to respond to the user as the user engages in these natural conversations. This results in various technical advantages that conserve computational resources at a client device, and can cause dialog sessions to be concluded in a quicker and more efficient manner. For instance, a quantity of occurrences of the automated assistant failing can be reduced since the automated assistant can wait for more information from the user prior to attempting to perform any fulfillment on behalf of the user. Also, for instance, a quantity of user inputs received at the client device can be reduced since a quantity of occurrences of the user having to repeat themselves or re-invoke the automated assistant can be reduced.

Figure 3A:
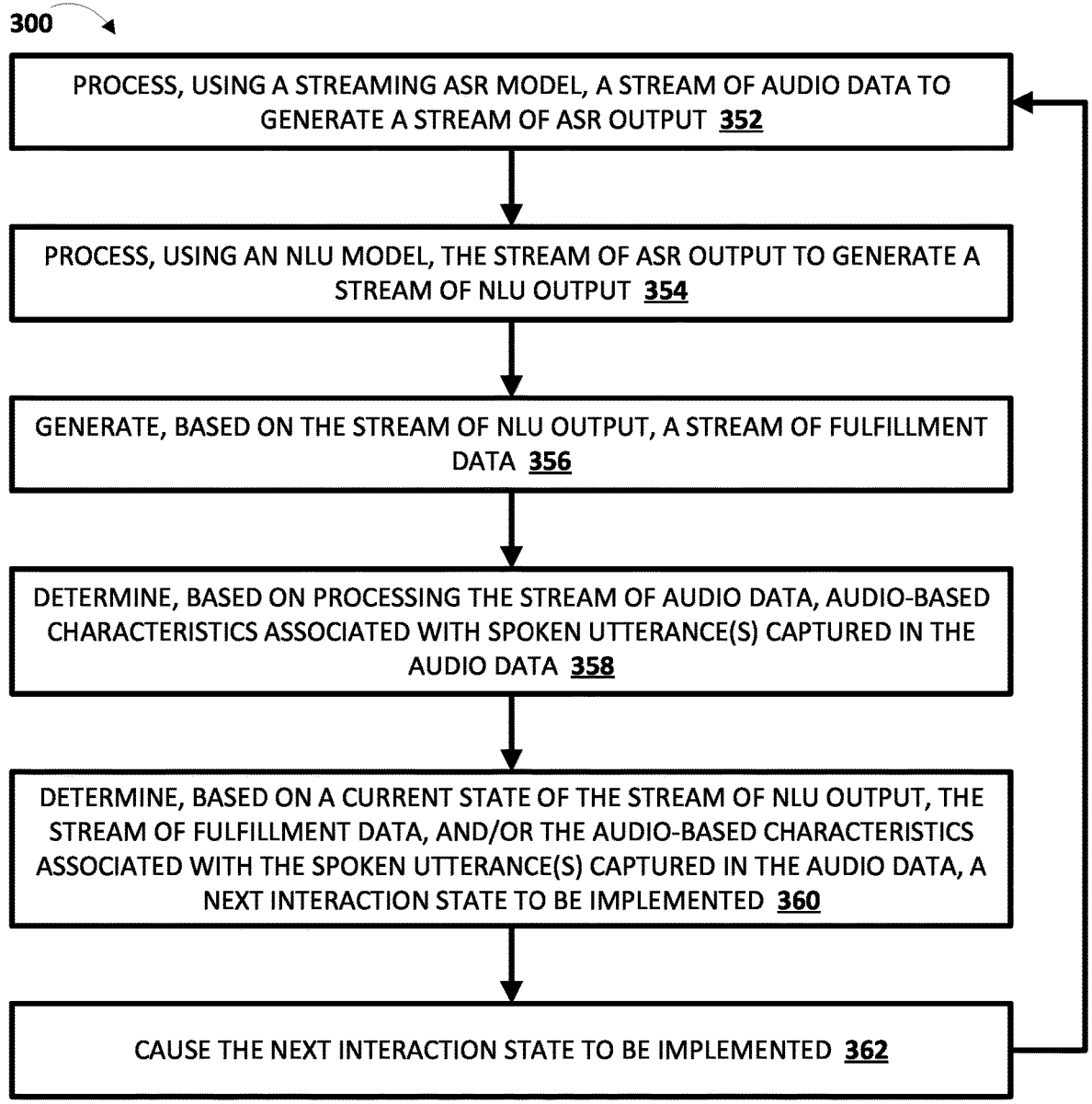
FIG. 3A and FIG. 3B depict flowcharts illustrating an example method of determining whether a next interaction state to be implemented during a dialog session is (i) causing fulfillment output to be implemented, (ii) causing natural conversation output to be audibly rendered for presentation to a user, or (iii) refraining from causing any interaction to be implemented, in accordance with various implementations.

Turning now to FIG. 3A, a flowchart illustrating an example method 300 of determining whether a next interaction state to be implemented during a dialog session is (i) causing fulfillment output to be implemented, (ii) causing natural conversation output to be audibly rendered for presentation to a user, or (iii) refraining from causing any interaction to be implemented is depicted. For convenience, the operations of the method 300 are described with reference to a system that performs the operations. This system of the method 300 includes one or more processors, memory, and/or other component(s) of computing device(s) (e.g., client device 110 of FIG. 1, client device 110A of FIG. 4, client device 110B of FIGS. 5A-5C, and/or computing device 610 of FIG. 6, one or more servers, and/or other computing devices). Moreover, while operations of the method 300 are shown in a particular order, this is not meant to be limiting. One or more operations may be reordered, omitted, and/or added.

At block 352, the system processes, using a streaming ASR model, a stream of audio data to generate a stream of ASR output. The stream of audio data can be generated by microphone(s) of a client device of a user that is engaged in a dialog session with an automated assistant implemented at least in part at the client device. Further, the stream of audio data can capture one or more spoken utterances of the user that are directed to the automated assistant. In some implementations, the system may process the stream of audio data in response to determining that the user has invoked the automated assistant via one or more particular words and/or or phrases (e.g., hotwords, such as "Hey Assistant", "Assistant", etc.), actuation of one or more buttons (e.g., software and/or hardware buttons), one or more gestures captured by vision component(s) of the client device that, when detect, invoke the automated assistant, and/or by any other means. At block 354, the system processes, using an NLU model, the stream of ASR output to generate a stream of NLU output. At block 356, the system generates, based on the stream of NLU output, a stream of fulfillment data. At block 358, the system determines, based on processing the stream of audio data, audio-based characteristics associated with one or more spoken utterances captured in the audio data. The audio-based characteristics can include, for example, one or more prosodic properties associated with each of the one or more spoken utterances (e.g., intonation, tone, stress, rhythm, tempo, pitch, pause, and/or other prosodic properties), a duration of time that has elapsed since the user provided a most recent spoken utterance of the one or more spoken utterances, and/or other audio-based characteristics that can be determined based on processing the stream of audio data.

At block 360, the system determines, based on a current state of the stream of NLU output, the stream of fulfillment data, and/or the audio-based characteristics associated with the one or more spoken utterances captured in the audio data, a next interaction state to be implemented. In some implementations, the current state can be based on NLU output, fulfillment data, and/or audio-based characteristics at the current instance of time in the dialog session. In additional or alternative implementations, the current state can be based on NLU output, fulfillment data, and/or audio-based characteristics at one or more prior instances of time in the dialog session. Put another way, the current state can correspond to a state of the dialog session within the context of a most recent spoken utterance provided by the user and/or the entire dialog session as a whole. The system can determine the next interaction state to be implemented based on the current state using, for example, the method 360A of FIG. 3B.

Figure 3B:
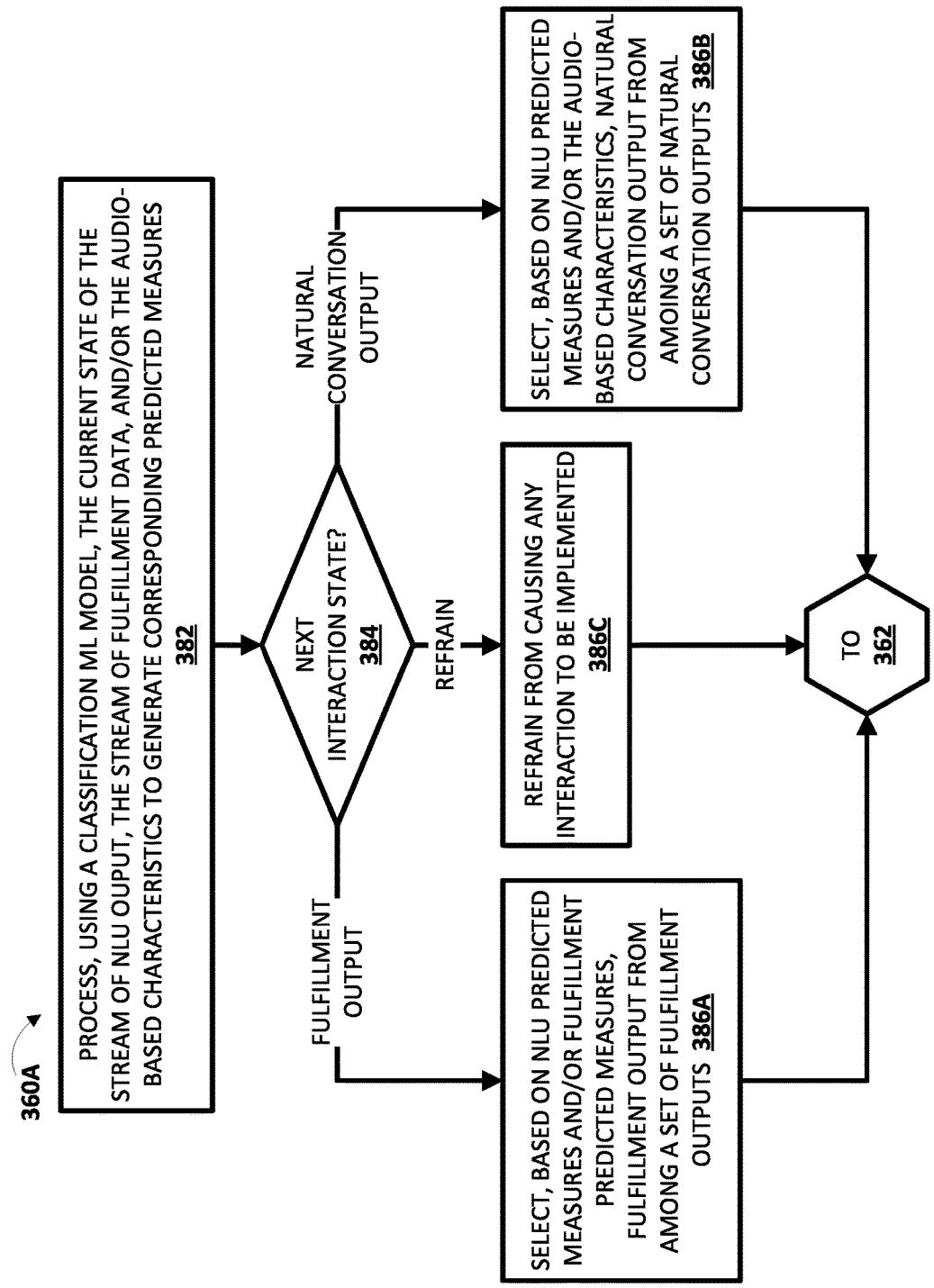

Referring to FIG. 3B, and at block 382, the system processes, using a classification ML model, the current state of the stream of NLU output, the stream of fulfillment data, and/or the audio-based characteristics to generate corresponding predicted measures. For example, the system can generate a first corresponding predicted measure associated with (i) causing fulfillment output to be implemented, a second corresponding predicted measure associated with (ii) causing natural conversation output to be audibly rendered for presentation to a user, and a third corresponding predicted measure associated with (iii) refraining from causing any interaction to be implemented. The corresponding predicted measures can be, for example, a binary value, a probability, a log likelihood, etc. that is indicative of the likelihood that one of (i) causing fulfillment output to be implemented, (ii) causing natural conversation output to be audibly rendered for presentation to a user, and (iii) refraining from causing any interaction to be implemented should be implemented as the next interaction state.

At block 384, the system can determine, based on the corresponding predicted measures, whether a next interaction state is: (i) causing fulfillment output to be implemented, (ii) causing natural conversation output to be audibly rendered for presentation to a user, or (iii) refraining from causing any interaction to be implemented.

If, at an iteration of block 384, the system determines, based on the corresponding predicted measures, the next interaction state is (i) causing fulfillment output to be implemented, then the system may proceed to block 386A. At block 386A, the system selects, based on NLU predicted measures associated with the stream of NLU output and/or fulfillment measures associated with the stream of fulfillment data, fulfillment output from among a set of fulfillment outputs (e.g., as described with respect to the fulfillment output engine 163 of FIGS. 1 and 2). The set of fulfillment outputs can be generated by a plurality of agents (e.g., as described with respect to the 1P agent(s) 171 and/or the 3P agent(s) 172 of FIGS. 1 and 2). The system can return to block 362 of FIG. 3A, and cause the next interaction state to be implemented. Put another way, the system can cause the fulfillment output selected at block 386A to be implemented.

If, at an iteration of block 384, the system determines, based on the corresponding predicted measures, the next interaction state is (ii) causing natural conversation output to be audibly rendered for presentation to a user, then the system may proceed to block 386B. At block 386B, the system selects, based on NLU predicted measures associated with the stream of NLU output and/or the audio-based characteristics determined at block 360, natural conversation output from among a set of natural conversation outputs. The set of natural conversation outputs can be generated based on one or more databases that include a superset of natural conversation outputs (e.g., as described with respect to the natural conversation output engine 164 of FIGS. 1 and 2). The system can return to block 362 of FIG. 3A, and cause the next interaction state to be implemented. Put another way, the system can cause the natural conversation output selected at block 386B to be audibly rendered for presentation to the user.

If, at an iteration of block 384, the system determines, based on the corresponding predicted measures, the next interaction state is (iii) refraining from causing any interaction to be implemented, then the system may proceed to block 384C. At block 384BA, the system refrains from causing interaction to be implemented. The system can return to block 362 of FIG. 3A, and cause the next interaction state to be implemented. Put another way, the system can cause the automated assistant to continue to process the stream of audio data without performing any action at this given instance of time of the dialog session.

Notably, and referring back to FIG. 3A, after the system can cause the next interaction state to be implemented at block 362, the system returns to block 352. At a subsequent iteration of block 352, the system continues processing the stream of audio data to continue generating the stream of ASR output, the stream of NLU data, and the stream of fulfillment data. Further, one or more additional audio-based characteristics can be determined based on processing the stream of audio data at this subsequent iteration. AS a result, the current state can be updated for this subsequent iteration, and a further next interaction state can be determined based on the updated current state. In this manner, the current state can be continuously updated to continuously determine the next interaction state for the dialog session.

Figure 4:
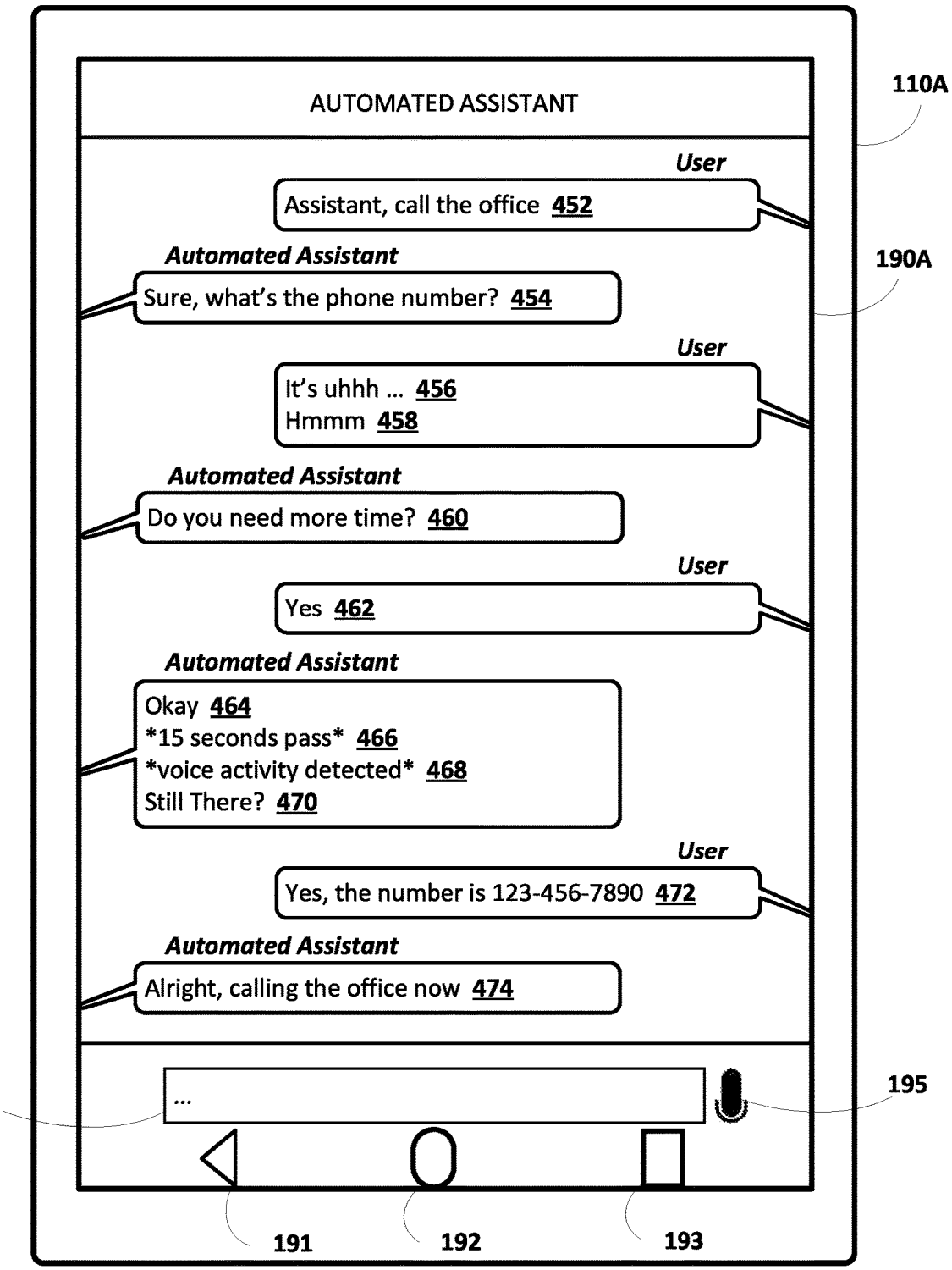
FIG. 4 depict a non-limiting example of determining whether a next interaction state to be implemented during a dialog session is (i) causing fulfillment output to be implemented, (ii) causing natural conversation output to be audibly rendered for presentation to a user, or (iii) refraining from causing any interaction to be implemented, in accordance with various implementations.

Turning now to FIG. 4, a non-limiting example of determining whether a next interaction state to be implemented during a dialog session is (i) causing fulfillment output to be implemented, (ii) causing natural conversation output to be audibly rendered for presentation to a user, or (iii) refraining from causing any interaction to be implemented is depicted. An automated assistant can be implemented at least in part at client device 110A (e.g., the automated assistant 115 described with respect to FIG. 1). The automated assistant can utilize a natural conversation system (e.g., the natural conversation system 180 described with respect to FIG. 1) to determine the next interaction state. The client device 110A depicted in FIG. 4 may include various user interface components including, for example, microphone(s) to generate audio data based on spoken utterances and/or other audible input, speaker(s) to audibly render synthesized speech and/or other audible output, and a display 190A to receive touch input and/or to visually render transcriptions and/or other visual output. Although the client device 110A depicted in FIG. 4 is a mobile device, it should be understood that is for the sake of example and is not meant to be limiting.

Further, and as shown in FIG. 4, the display 190A of the client device 110A includes various system interface elements 191, 192, and 193 (e.g., hardware and/or software interface elements) that may be interacted with by the user of the client device 110A to cause the client device 110A to perform one or more actions. The display 190A of the client device 110A enables the user to interact with content rendered on the display 190A by touch input (e.g., by directing user input to the display 190A or portions thereof (e.g., to text entry box 194 or to other portions of the display 190A) and/or by spoken input (e.g., by selecting microphone interface element 195—or just by speaking without necessarily selecting the microphone interface element 195 (i.e., the automated assistant may monitor for one or more particular terms or phrases, gesture(s) gaze(s), mouth movement(s), lip movement(s), and/or other conditions to activate spoken input at the client device 110A).

For example, assume a user of the client device 110A provides a spoken utterance 452 of "Assistant, call the office" to initiate a dialog session. Notably, in initiating the dialog session, the user is requesting that the automated assistant place a telephone call on behalf of the user. The automated assistant can determine, based on a current state of a stream of NLU data, a stream of fulfilment data, and/or audio-based characteristics that are generated based on processing a stream of audio data that captures the spoken utterance 452, a next interaction state to be implemented in furtherance of the dialog session. For instance, assume the automated assistant determines, based on the stream of NLU data (e.g. that is utilized in determining the current state) that the spoken utterance 452 is associated with an intent of placing a telephone call on behalf of the user, and that a slot value for a phone number parameter corresponds to "office". In this instance, the stream of NLU data can be processed by a plurality of agents (e.g., the 1P agent(s) 171 and/or the 3P agent(s) 172 of FIG. 1) to generate the stream of fulfillment data (e.g. that is utilized in determining the current state). Further assume that the stream of fulfillment data indicates that there is no available contact entry for the "office" parameter, such that the slot value for a phone number parameter is unresolved.

In this example, and based on at least the stream of NLU data and the stream of fulfilment data, the current state determined may indicate that one or more fulfillment outputs should be implemented as the next interaction state in furtherance of the dialog session. The one or more fulfillment outputs to be implemented can be selected from among a set of fulfillment outputs. The set of fulfillment outputs may include, for example, an assistant command to initiate a phone call on behalf of a user with a contact entry of "office", synthesized speech audio data that includes synthesized speech requesting more information about the contact entry "office", and/or other fulfillment outputs. Further, in this example, since the stream of fulfillment data indicates that there is no available contact entry for the "office", the automated assistant can select the next fulfillment output to be implemented as synthesized speech audio data that includes synthesized speech requesting more information about the contact entry "office". Accordingly, the automated assistant can cause synthesized speech 454 included in the synthesized speech audio data that requests more information about the contact entry "office" to be audibly rendered for presentation to the user via speaker(s) of the client device 110A. As shown in FIG. 4, the synthesized speech 454 can include "Sure, what's the phone number".

Further assume that, in response to the synthesized speech 454 being audibly rendered for presentation to the user, that the user provides a spoken utterance 456 of "It's uhhh . . . " followed by a several second pause, and a spoken utterance 458 followed by another several second pause. As the user provides the spoken utterances 456 and 458, the automated assistant can continue processing the stream of audio data generated by the microphone(s) of the client device 110A to iteratively update the current state to determine the next interaction state to be implemented. For example, at a given time instance of the dialog session after the user provided the spoken utterance 456 and before the user provided the spoken utterance 458, an intonation or speech cadence included the audio-based characteristics utilized in determining the current can indicate that the user is unsure about the phone number for the "office", but is attempting to find the phone number. In this example, the automated assistant may determine to refrain from causing any interaction to be implemented such that the user is provided time to complete his/her thoughts by locating the phone number. Accordingly, even though the automated assistant has determined that the user has completed the spoken utterance 456, the automated assistant can still wait for further information from the user. Further, at a given time instance of the dialog session after the user provided the spoken utterance 458, an intonation or speech cadence included the audio-based characteristics utilized in determining the current can still indicate that the user is unsure about the phone number for the "office". As a result, the automated assistant may still determine to refrain from causing any interaction to be implemented such that the user is provided time to complete his/her thoughts by locating the phone number. However, at a subsequent time instance of the dialog session (e.g., several seconds after the user provided the spoken utterance 458), the audio-based characteristics may include a duration of time since the user provided the spoken utterance 458.

In this example, and based on the stream of NLU data and the stream of fulfilment data (e.g., still indicating that the phone number for the "office" is needed to initiate the phone call on behalf of the user), and the audio-based characteristics indicating the user is unsure about the phone number and has been silent for several seconds, the current state determined may indicate that one or more natural conversation outputs should be implemented as the next interaction state in furtherance of the dialog session. Accordingly, even though the automated assistant has determined that the user has completed the spoken utterance 458 at the given time instance, the automated assistant can still wait for further information from the user such that it is not until this subsequent time instance (e.g., that is subsequent to the given time instance) that the one or more natural conversation outputs should be implemented as the next interaction state.

The one or more natural conversation outputs to be implemented can be selected from among a set of natural conversation outputs. The set of natural conversation outputs may include, for example, synthesized speech audio data that includes synthesized speech requesting whether the user would like more to gather information or his/her thoughts, synthesized speech audio data that includes synthesized speech requesting whether the user still has a desire to interact with the automated assistant, and/or other natural conversation outputs. Further, in this example, since the stream of fulfillment data indicates that there is no available contact entry for the "office" and the audio-based characteristics indicate that the user is not sure about the information associated with the contact entry for the "office", the automated assistant can select the next natural conversation output to be audibly rendered for presentation to the user should be synthesized speech audio data requesting whether the user would like more to gather information or his/her thoughts. Accordingly, the automated assistant can cause synthesized speech 460 included in the synthesized speech audio data that requests whether the user would like more to gather information or his/her thoughts to be audibly rendered for presentation to the user via speaker(s) of the client device 110A. As shown in FIG. 4, the synthesized speech 460 can include "Do you need more time?".

Further assume that, in response to the synthesized speech 460 being audibly rendered for presentation to the user, that the user provides a spoken utterance 462 of "Yes", and the automated assistant caused synthesized speech 464 of "Okay" to be audibly rendered for presentation to the user to confirm the user's desire for a delay of more time. In some implementations, and even if the user invoked the delay (e.g., by providing a spoken utterance of "Can you give me some time to find it?"), the automated assistant may continue processing the stream of audio data to update the current state, but determine the next interaction state to be implemented corresponds to refraining from any interaction to be implemented for a threshold duration of time (e.g., 10 seconds, 15 seconds, 30 seconds, etc.), unless the user directs further input to the automated assistant (e.g., spoken input, touch input, and/or typed input). In additional or alternative implementations, and even if the user invoked the delay, the automated assistant may continue processing the stream of audio data to update the current state, and determine the next interaction state to be implemented regardless of the delay.

For example, and as indicated by 466, further assume that 15 seconds has passed since the user provided the spoken utterance 462, and further assume that voice activity is detected as indicated by 468. In this example, the automated assistant can determine that the voice activity is detected by processing, using a VAD model, the stream of audio data. Further, the automated assistant can determine whether the detected voice activity is directed to the automated assistant based on an updated stream of NLU data generated based on the stream of audio data that captures the voice activity. Assuming that the voice activity is, in fact, directed to the automated assistant, the automated assistant can determine the next interaction state to be implemented based on the current state and cause the next interaction state to be implemented. However, assuming that the voice activity is not directed to the automated assistant, and as described with respect to FIG. 4, the audio-based characteristics determined based on processing the stream of audio data that voice activity that is not directed to the automated assistant has been detected, and that a duration of time since the user last provided a spoken utterance to the automated assistant is 15 seconds (or some other duration of time that may satisfy a threshold duration of time). Accordingly, at this time instance, the automated assistant can determine that the one or more natural conversation outputs should be implemented as the next interaction state to prompt the user. For instance, the automated assistant can cause synthesized speech 470 included in the synthesized speech audio data that requests the user indicate a desire of whether to continue interacting with the automated assistant. As shown in FIG. 4, the synthesized speech 470 can include "Still there?" as a prompt for the user to indicate a desire of whether to continue the dialog session with the automated assistant.

Further assume that the user provides a spoken utterance 472 of "Yes, the number is 123-456-7890" that is responsive to the synthesized speech 470. At this time, the automated assistant can update the current state based on the stream of audio data that captures the spoken utterance 472. For instance, the stream of NLU output can be updated to indicate the slot value for the phone number parameter (e.g., "123-456-7890"). As a result, the stream of fulfillment data can be updated to indicate that the phone call to the "office" can be initiated. Accordingly, at this instance of time, and based on the updated current state, the automated assistant can cause fulfillment output to be implemented. The fulfillment output to be implemented in this example can include the assistant command to initiate the phone call on behalf of a user with the "office" (e.g., phone number of "123-456-7890"), and can optionally include synthesized speech 474 of "Alright, calling the office now" to provide an indication to the user that the phone call is being initiated. Accordingly, in the example of FIG. 4, the automated assistant can iteratively determine the next interaction state to be implemented in furtherance of the dialog session, rather than simply responding to each spoken utterance as in turn-based dialog sessions.

Notably, although the phone call is not initiated until the time instance of the dialog session that is associated with the synthesized speech 474, the automated assistant can cause the assistant command of initiating the phone call to be partially fulfilled prior to this time instance. For example, the automated assistant can establish a connection with a phone application running in the background of the client device in response to receiving the spoken utterance 452 (or at another time instance of the dialog session) to reduce latency in the phone call being initiated when the user does eventually provide the slot value for the phone number parameter (e.g., as described with respect to the partial fulfillment engine 165 of FIG. 1). Moreover, although the dialog session is depicted as a transcription via an automated assistant application, it should be understood that is for the sake of example and is not meant to be limiting.

Figure 5A:
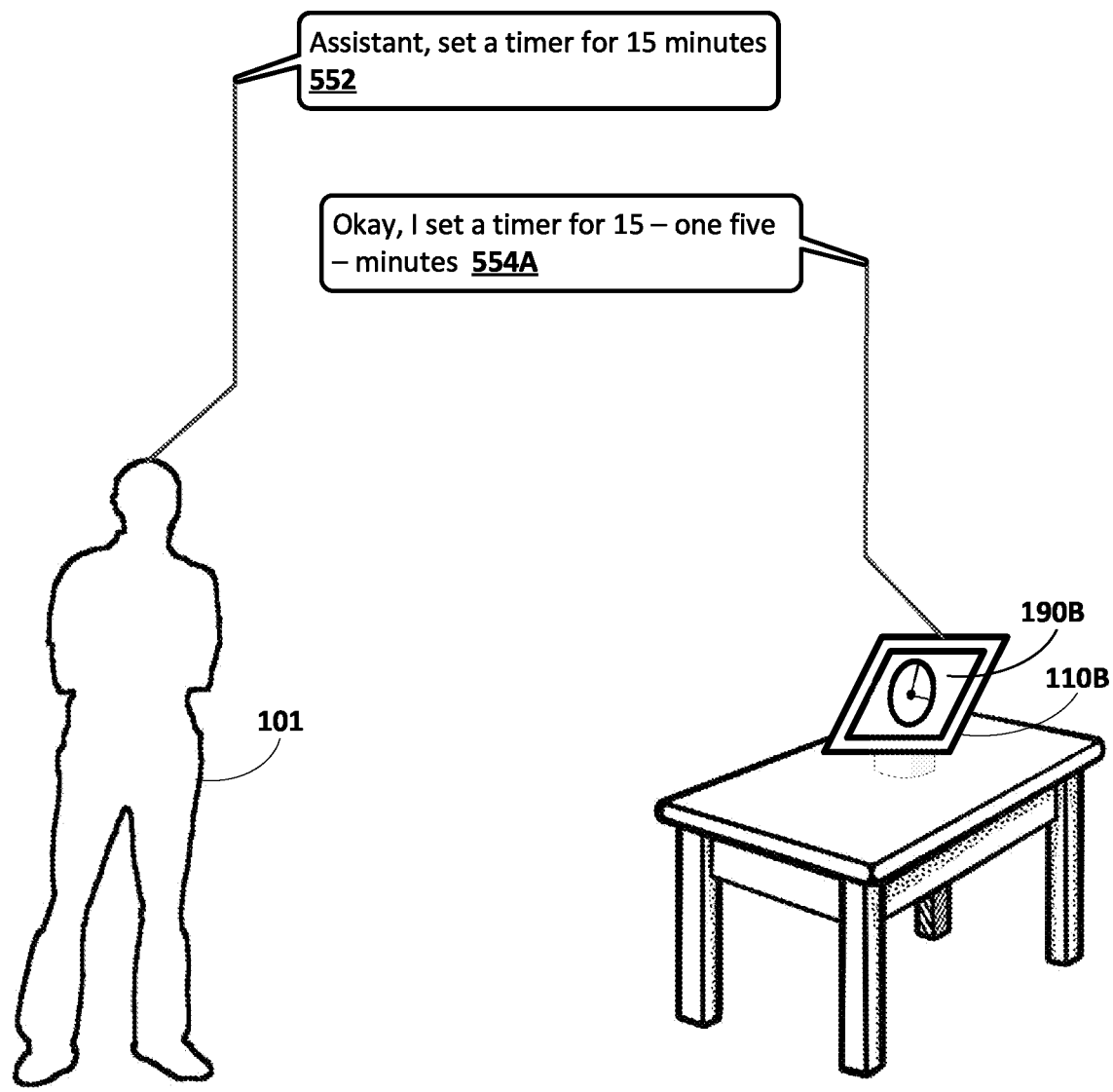
FIG. 5A, FIG. 5B, and FIG. 5C depict various non-limiting examples of causing fulfillment output to be implemented during a dialog session, in accordance with various implementations.
Figure 5B:
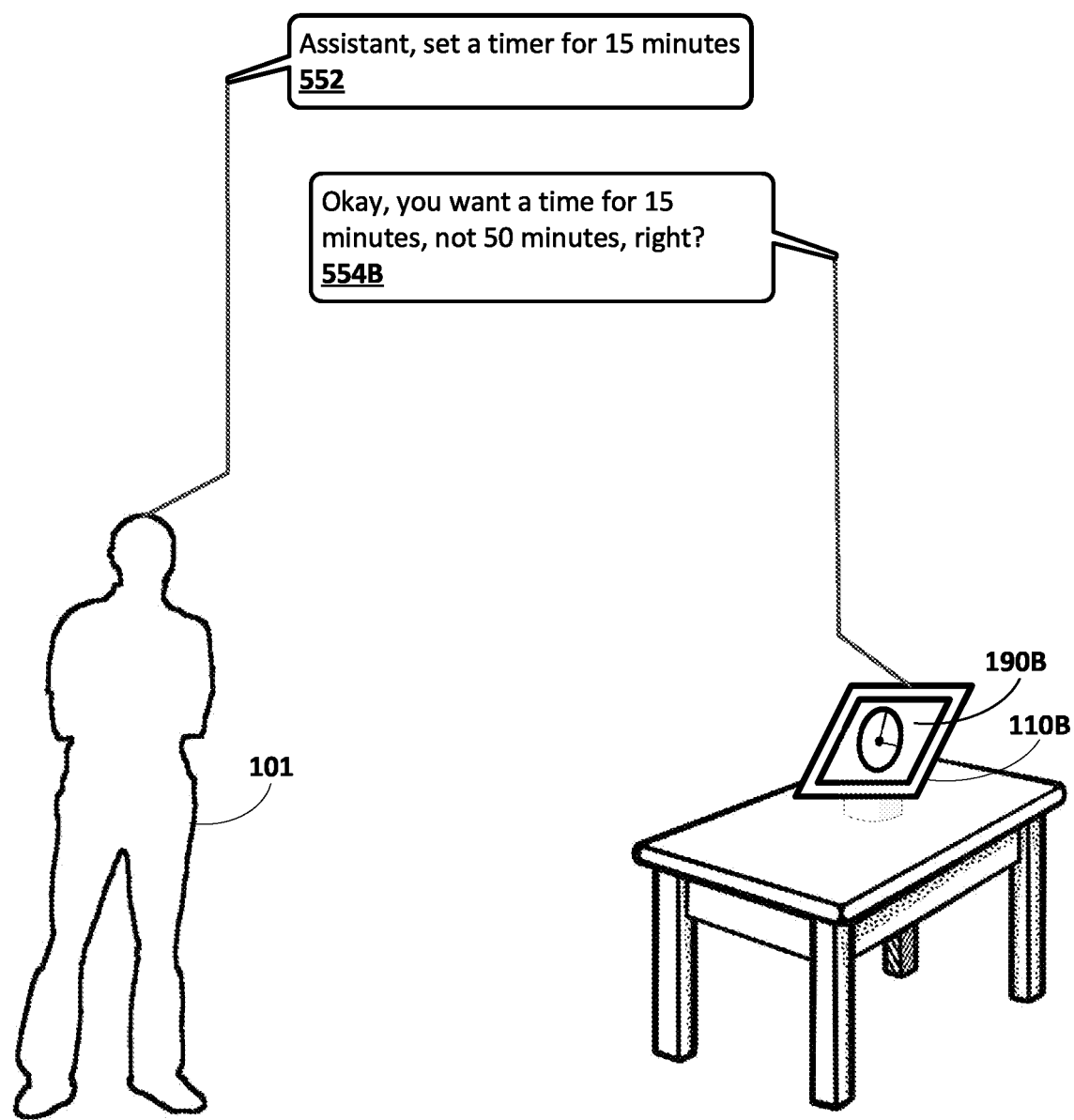
Figure 5C:
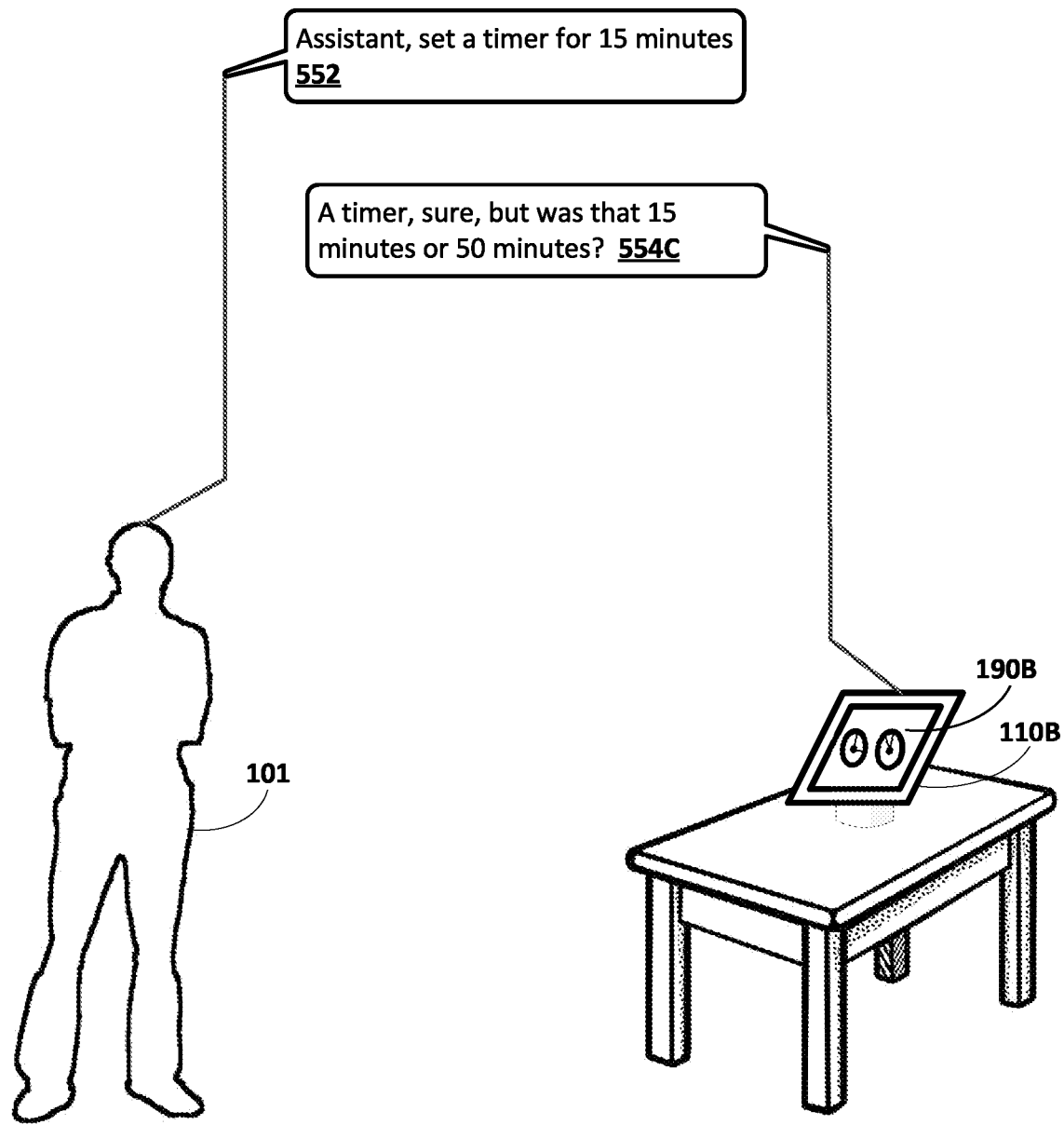

Turning now to FIGS. 5A, 5B, and 5C, various non-limiting examples of causing fulfillment output to be implemented during a dialog session are depicted. An automated assistant can be implemented at least in part at client device 110B (e.g., the automated assistant 115 described with respect to FIG. 1). The automated assistant can utilize a natural conversation system (e.g., the natural conversation system 180 described with respect to FIG. 1) to determine fulfillment output to be implemented assuming the automated assistant determines the fulfillment to be implemented as a next interaction state. The client device 110B depicted in FIGS. 5A, 5B, and 5C may include various user interface components including, for example, microphone(s) to generate audio data based on spoken utterances and/or other audible input, speaker(s) to audibly render synthesized speech and/or other audible output, and a display 190B to receive touch input and/or to visually render transcriptions and/or other visual output. Although the client device 110B depicted in FIGS. 5A, 5B, and 5C is a standalone interactive speaker having the display 190B, it should be understood that is for the sake of example and is not meant to be limiting.

For the sake of example throughout FIGS. 5A, 5B, and 5C, assume that a user 101 provides a spoken utterance 552 of "Assistant, set a timer for 15 minutes". Further assume that the automated assistant has determined a next interaction state to be implemented is causing one or more fulfillment outputs to be implemented based on a current state of a stream of NLU output, a stream of fulfillment data, and/or audio-based characteristics that is generated based on processing a stream of audio data that captures the spoken utterance 552. However, in these examples, the one or more fulfillment outputs that are implemented by the automated assistant may vary based on NLU measures associated with the stream of NLU data utilized in determining the current state and/or fulfillment measures associated with the stream of fulfillment data utilized in determining the current state.

Referring specifically to FIG. 5A, further assume that the NLU measures, the fulfillment measures, and/or some combination of the NLU measures and the fulfillment measures (e.g., an average of the measures, a lowest of the measures, etc.) indicate that the automated assistant is highly confident that the user indicated a desire to set a timer for 15 minutes. For instance, assume the NLU measures and/or the fulfillment measures satisfy a first threshold measure and a second threshold measure (or a respective first threshold measure and a respective second threshold measure if considered individually). Accordingly, the NLU measures can indicate this high confidence in an intent associated with setting a timer along with a slot value for a duration parameter of 15 minutes, and the fulfillment measures can indicate this high confidence in an assistant command to set the timer for 15 minutes. As a result, the automated assistant can select fulfillment output of: 1) implementing an assistant command to set the timer to 15 minutes, 2) implementing graphical content to be provided for visual presentation to the user as indicated by the 15 minute timer illustrated at the display 190B; and/or 3) implementing synthesized speech 554A of "Okay, I set a timer for 15—one five—minutes".

Referring specifically to FIG. 5B, further assume that the NLU measures, the fulfillment measures, and/or some combination of the NLU measures and the fulfillment measures (e.g., an average of the measures, a lowest of the measures, etc.) indicate that the automated assistant is mildly confident that the user indicated a desire to set a timer for 15 minutes. For instance, assume the NLU measures and/or the fulfillment measures satisfy a first threshold measure, but not a second threshold measure (or a respective first threshold measure, but not a respective second threshold measure if considered individually). Accordingly, the NLU measures can indicate this mild confidence in an intent associated with setting a timer along with a slot value for a duration parameter of 15 minutes (but also consider a slot value for the duration parameter of 50 minutes), and the fulfillment measures can indicate this mild confidence in an assistant command to set the timer for 15 minutes (but also consider an assistant command to set the timer for 50 minutes). As a result, the automated assistant can select fulfillment output of: 1) implementing graphical content to be provided for visual presentation to the user as indicated by the 15 minute timer illustrated at the display 190B; and/or 2) implementing synthesized speech 554B of "Okay, you want a timer for 15 minutes, not 50 minutes, right?". In this example, the automated assistant may not implement an assistant command to set the timer to 15 minutes until the user has confirmed the timer is to be set for 15 minutes and not 50 minutes, but the assistant command may already be partially fulfilled (as indicated by implementing the graphical content provided for visual presentation to the user).

Referring specifically to FIG. 5C, further assume that the NLU measures, the fulfillment measures, and/or some combination of the NLU measures and the fulfillment measures (e.g., an average of the measures, a lowest of the measures, etc.) indicate that the automated assistant is not confident that the user indicated a desire to set a timer for 15 minutes. For instance, assume the NLU measures and/or the fulfillment measures fail to satisfy both a first threshold measure and a second threshold measure (or a respective first threshold measure and a respective second threshold measure if considered individually). Accordingly, the NLU measures can indicate this low confidence in an intent associated with setting a timer along with a slot values for a duration parameter of 15 minutes or 50 minutes, and the fulfillment measures can indicate this low confidence in an assistant command to set the timer for 15 minutes or 50 minutes. As a result, the automated assistant can select fulfillment output of: 1) implementing graphical content to be provided for visual presentation to the user as indicated by both the 15 minute timer and the 50 minute illustrated at the display 190B; and/or 2) implementing synthesized speech 554C of "A timer, sure, but was that 15 minutes or 50 minutes?". In this example, the automated assistant may not implement an assistant commands to set the timer to 15 minutes or 50 minutes until the user has confirmed the timer is to be set for 15 minutes and not 50 minutes, but the assistant commands may already be partially fulfilled (as indicated by implementing the graphical content provided for visual presentation to the user).

Accordingly, even in instances where the automated assistant determines the next interaction state to be implemented is causing fulfillment output to be implemented (rather than causing natural conversation output to be audibly rendered or refrain from causing interaction to be implemented), the automated assistant can still determine what to include as the fulfillment output. Although FIGS. 5A, 5B, and 5C are described with respect to particular fulfillment outputs being implemented based on particular thresholds, it should be understood that is for the sake of example and is not meant to be limiting. For instance, multiple additional or alternative thresholds can be utilized to determine the fulfillment output to be implemented. Also, for instance, the fulfillment outputs may differ from those depicted. For example, and referring back to FIG. 4A, the automated assistant may simply set the time to 15 minutes for the user without providing the synthesized speech 554A since the automated assistant is highly confident the user indicated a desire to set the timer to 15 minutes.

Figure 6:
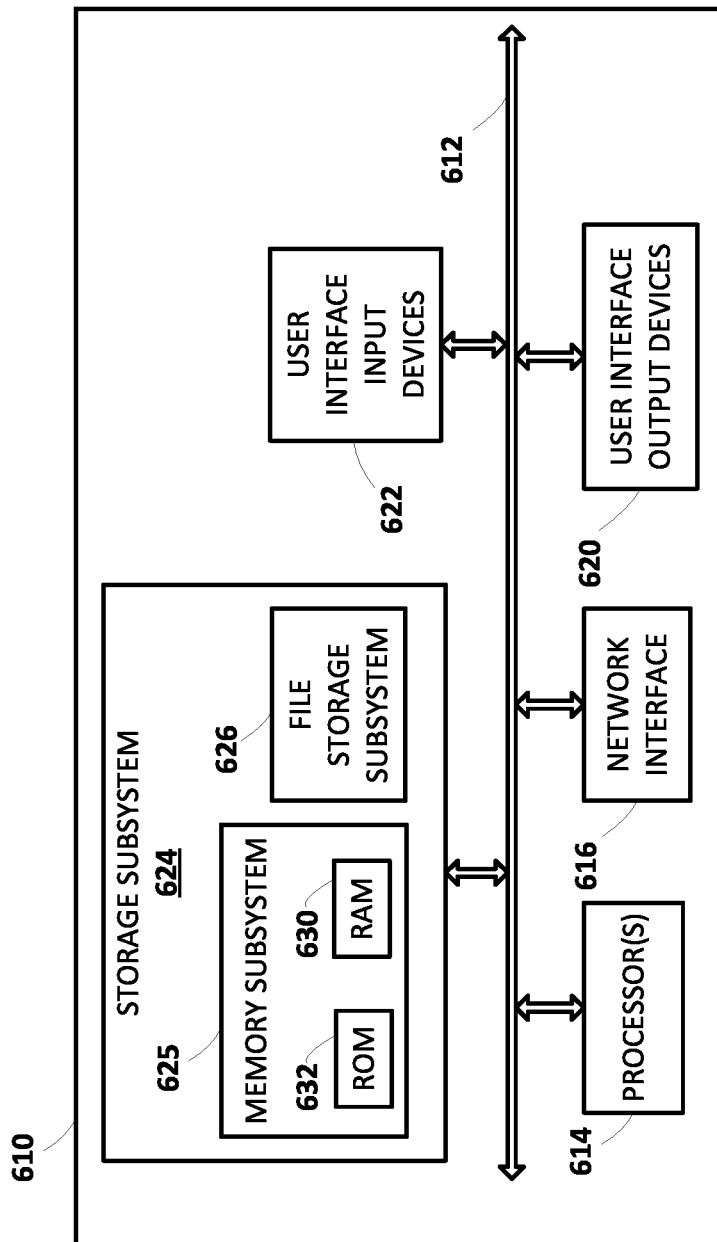
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes processing, using an automatic speech recognition (ASR) model, a stream of audio data to generate a stream of ASR output, the stream of audio data being generated by one or more microphones of the client device, and the stream of audio data capturing one or more spoken utterances of the user that are directed to an automated assistant implemented at least in part at the client device; processing, using a natural language understanding (NLU) model, the stream of ASR output, to generate a stream of NLU output; generating, based on the stream of NLU output, a stream of fulfillment data; determining, based on processing the stream of audio data, audio-based characteristics associated with one or more of the spoken utterances; determining, based on a current state of the stream of NLU output, the stream of fulfillment data, and the audio-based characteristics associated with one or more of the spoken utterances, whether a next interaction state to be implemented is: (i) causing fulfillment output, that is generated based on the stream of fulfillment data, to be implemented, (ii) causing natural conversation output to be audibly rendered for presentation to the user, or (iii) refraining from causing any interaction to be implemented; and causing the next interaction state to be implemented.

These and other implementations of technology disclosed herein can optionally include one or more of the following features.

In some implementations, determining whether the next interaction state to be implemented is (i) causing fulfillment output, that is generated based on the stream of fulfillment data, to be implemented, (ii) causing natural conversation output to be audibly rendered for presentation to the user, or (iii) refraining from causing any interaction to be implemented, based on the current state of the stream of NLU output, the stream of fulfillment data, and the audio-based characteristics associated with one or more of the spoken utterances may include processing, using a classification machine learning (ML) model, the current state of the stream of NLU output, the stream of fulfillment data, and the audio-based characteristics to generated a corresponding predicted response measures associated with each of (i) causing fulfillment output, that is generated based on the stream of fulfillment data, to be implemented, (ii) causing natural conversation output to be audibly rendered for presentation to the user, and (iii) refraining from causing any interaction to be implemented; and determining, based on the corresponding predicted response measures, whether the next interaction state to be implemented is to (i) causing fulfillment output, that is generated based on the stream of fulfillment data, to be implemented, (ii) causing natural conversation output to be audibly rendered for presentation to the user, or (iii) refraining from causing any interaction to be implemented.

In some implementations, the method may further include determining, based on the stream of fulfillment data, a set of fulfillment outputs; and selecting, based on predicted NLU measures associated with the stream of NLU data and/or predicted fulfillment measures associated with the stream of fulfillment data, the fulfillment output from among the set of fulfillment outputs.

In some versions of those implementations, selecting the fulfillment output from among the set of the fulfillment outputs may be in response to determining the next interaction state to be implemented is (i) causing fulfillment output, that is generated based on the stream of fulfillment data, to be implemented. Selecting the fulfillment output from among the set of fulfillment outputs based on the predicted NLU measures associated with the stream of NLU data and/or the predicted fulfillment measures associated with the stream of fulfillment data may include selecting a first fulfillment output, from among the set of fulfillment outputs, as the fulfillment output in response to determining the predicted NLU measures associated with the stream of NLU data and/or the predicted fulfillment measures associated with the stream of fulfillment data satisfy both a first threshold measure and a second threshold measure.

In some further versions of those implementations, selecting the fulfillment output from among the set of fulfillment outputs based on the predicted NLU measures associated with the stream of NLU data and/or the predicted fulfillment measures associated with the stream of fulfillment data further may include selecting a second fulfillment output, from among the set of fulfillment outputs, as the fulfillment output in response to determining the predicted NLU measures associated with the stream of NLU data and/or the predicted fulfillment measures associated with the stream of fulfillment data satisfy both the first threshold measure, but not the second threshold measure. The second fulfillment output may differ from the first fulfillment output.

In some additional or alternative further versions of those implementations selecting the fulfillment output from among the set of fulfillment outputs based on the predicted NLU measures associated with the stream of NLU data and/or the predicted fulfillment measures associated with the stream of fulfillment data further may include selecting a third fulfillment output, from among the set of fulfillment outputs, as the fulfillment output in response to determining the predicted NLU measures associated with the stream of NLU data and/or the predicted fulfillment measures associated with the stream of fulfillment data fails to satisfy both the first threshold measure and the second threshold measure. The third fulfillment output may differ from both the first fulfillment output and the second fulfillment output.

In some versions of those implementations, determining the set of fulfillment outputs based on the stream of fulfillment data may include processing, using a plurality of first-party agents, the fulfillment data to generate corresponding first-party fulfillment output; and incorporating the corresponding first-party fulfillment output into the set of fulfillment outputs. In some further versions of those implementations, determining the set of fulfillment outputs based on the stream of fulfillment data may further include transmitting, over one or more networks, the fulfillment data from the client device to one or more third-party systems; receiving, over one or more of the networks, the corresponding third-party fulfillment outputs, at the client device and from the one or more third-party systems; and incorporating the corresponding third-party fulfillment output generated using the plurality of first-party verticals into the set of fulfillment outputs. Transmitting the fulfillment data to the one or more of third-party systems causes each of the third-party systems to process, using a corresponding third-party agent, the fulfillment data to generate corresponding third-party fulfillment output.

In some versions of those implementations, the method may further include, prior to causing any synthesized speech corresponding to the fulfillment output generated based on the stream of fulfillment data to be audibly rendered via one or more speakers of the client device: initiating, for one or more of the fulfillment outputs in the set of fulfillment outputs, partial fulfillment, wherein the partial fulfillment is specific to each of the fulfillment outputs in the set of fulfillment outputs.

In some implementations, the fulfillment output may include one or more of: synthesized speech audio data that includes synthesized speech corresponding to the fulfillment output to be audibly rendered for presentation to the user via one or more of the speakers of the client device, graphical content corresponding to the fulfillment output to be visually rendered for presentation to the user via a display of the client device or an additional client device in communication with the client device, or an assistant command corresponding to the fulfillment output that, when executed, causes the automated assistant to control the client device or an additional client device in communication with the client device.

In some implementations, the method may further include maintaining, in one or more databases accessible by the client device, a set of natural conversation outputs; and selecting, based on at least the audio-based characteristics associated with one or more of the spoken utterances, the natural conversation output from among the set of natural conversation outputs. In some versions of those implementations, selecting the natural conversation output from among the set of the natural conversation outputs may be in response to determining the next interaction state to be implemented is (ii) causing natural conversation output to be audibly rendered for presentation to the user. Selecting the natural conversation output from among the set of natural conversation outputs may include selecting a first natural conversation output, from among the set of natural conversation outputs, as the natural conversation output based on predicted measures associated with the NLU output and the audio-based characteristics associated with one or more of the spoken utterances. In some further versions of those implementations, selecting the natural conversation output from among the set of natural conversation outputs may further include selecting a second natural conversation output, from among the set of natural conversation outputs, as the natural conversation output based on the predicted measures associated with the NLU output and the audio-based characteristics associated with one or more of the spoken utterances. The second natural conversation output may differ from the first natural conversation output.

In some implementations, the method may further include, in response to determining the next interaction state to be implemented is (iii) refraining from causing any interaction to be implemented: processing, using a voice activity detection model, the stream of audio data to monitor for an occurrence of voice activity; and in response to detecting the occurrence of voice activity: determining whether the occurrence of voice activity is directed to the automated assistant. In some versions of those implementations, determining whether the occurrence of voice activity is directed to the automated assistant may include processing, using the ASR model, the stream of audio data to continue generating the stream of ASR output; processing, using the NLU model, the stream of ASR output, to continue generating the stream of NLU output; and determining, based on the stream of NLU output, whether the occurrence of voice activity is directed to the automated assistant. In some further versions of those implementations, the method may further include, in response to determining that the occurrence of voice activity is directed to the automated assistant: continue generating, based on the stream of NLU output, the stream of fulfillment data; and updating, based on the stream of fulfillment data, a set of fulfillment outputs from which the fulfillment output is selected. In additional or alternative further versions of those implementations, the method may further include, in response to determining that the occurrence of voice activity is not directed to the automated assistant: determining whether a threshold duration of time has lapsed since the user provided the one or more spoken utterances; and in response to determining the threshold duration of time has lapsed since the user provided the one or more spoken utterances: determining the next interaction state to be implemented is (ii) causing natural conversation output to be audibly rendered for presentation to the user. In yet further versions of those implementations, the natural conversation output to be audibly rendered for presentation to the user via one or more of the speakers of the client device may include one or more of: an indication of a desire whether to continue interacting with the automated assistant; or a request that the user provide additional user input in furtherance of a dialog session between the user and the automated assistant.

In some implementations, the audio-based characteristics associated with one or more of the spoken utterances may include one or more of: one or more prosodic properties associated with each of the one or more spoken utterances, wherein the one or more prosodic properties comprise one or more of: intonation, tone, stress, rhythm, tempo, pitch, and pause; or a duration of time that has elapsed since the user provided a most recent spoken utterance of the one or more spoken utterances.

In some implementations, the current state of the stream of NLU output, the stream of fulfillment data, and the audio-based characteristics associated with one or more of the spoken utterances may include a most recent instance of the NLU output generated based on a most recent spoken utterance of the one or more spoken utterances, a most recent instance of the fulfillment data generated based on the most recent NLU output, and a most recent instance of the audio-based characteristics generated based on the most recent spoken utterance. In some versions of those implementations, the current state of the stream of NLU output, the stream of fulfillment data, and the audio-based characteristics associated with one or more of the spoken utterances may further include one or more historical instances of the NLU output generated based on one or more historical spoken utterances that precede the most recent spoken utterance, one or more historical instances of the fulfillment data generated based on the one or more historical instances of the NLU output, and one or more historical instances of the audio-based characteristics generated based on the one or more historical spoken utterances.

In some implementations, a method implemented by one or more processors is provided, and includes processing, using an automatic speech recognition (ASR) model, a stream of ASR output, the stream of audio data being generated by one or more microphones of the client device, and the stream of audio data capturing one or more spoken utterances of the user that are directed to an automated assistant implemented at least in part at the client device; processing, using a natural language understanding (NLU) model, the stream of ASR output, to generate a stream of NLU output; generating, based on the stream of NLU output, a stream of fulfillment data; determining, based on processing the stream of audio data, audio-based characteristics associated with one or more of the spoken utterances; determining, based on a current state of the stream of NLU output, the stream of fulfillment data, and the audio-based characteristics associated with one or more of the spoken utterances, (i) when to cause synthesized speech audio data that includes synthesized speech to be audibly rendered for presentation to the user, and (ii) what to include in the synthesized speech; and in response to determining to cause the synthesized speech audio data to be audibly rendered for presentation to the user: causing the synthesized speech audio data to be audibly rendered via one or more speakers of the client device; and in response to determining not to cause the synthesized speech audio data to be audibly rendered for presentation to the user: refraining from causing the synthesized speech audio data from being audibly rendered via one or more of the speakers of the client device.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
   processing, using an automatic speech recognition (ASR) model, a stream of audio data to generate a stream of ASR output, the stream of audio data being generated by one or more microphones of a client device, and the stream of audio data capturing one or more spoken utterances of a user that are directed to an automated assistant implemented at least in part at the client device;
   processing, using a natural language understanding (NLU) model, the stream of ASR output, to generate a stream of NLU output;
   generating, based on the stream of NLU output, a stream of fulfillment data;
   determining, based on processing the stream of audio data, audio-based characteristics associated with one or more of the spoken utterances;
   determining, based on a current state of the stream of NLU output, the stream of fulfillment data, and the audio-based characteristics associated with one or more of the spoken utterances, whether a next interaction state to be implemented is:
      (i) causing fulfillment output, that is generated based on the stream of fulfillment data, to be implemented,
      (ii) causing natural conversation output to be audibly rendered for presentation to the user, or
      (iii) refraining from causing any interaction state to be implemented;
   prior to determining the next interaction state to be implemented:
      determining, based on the stream of fulfillment data, multiple candidate given fulfillment outputs that are predicted to satisfy the one or more spoken utterances of the user; and
      as the user continues to provide the one or more spoken utterances:
         initiating, for each of the multiple candidate given fulfillment outputs, corresponding partial fulfillment, wherein the corresponding partial fulfillment for the multiple candidate given fulfillment outputs comprises at least:
            for a first candidate given fulfillment output, from among the multiple candidate given fulfillment outputs, establishing a corresponding connection with one of: a given software application that is accessible by the client device, a given first-party agent, a given third-party agent, or a given additional client device that is in addition to the client device; and
            for a second candidate given fulfillment output, from among the multiple candidate given fulfillment outputs, establishing a corresponding connection with another one of: the given software application that is accessible by the client device, the given first-party agent, the given third-party agent, or the given additional client device that is in addition to the client device;
      generating, based on the stream of NLU output, an update stream of fulfillment data; and
      determining, based on the updated stream of fulfillment data, a given fulfillment output, from among the multiple candidate given fulfillment outputs, to be implemented; and
   in response to determining the next interaction state to be implemented:
      causing the next interaction state to be implemented.

2. The method of claim 1, wherein determining whether the next interaction state to be implemented is (i) causing fulfillment output, that is generated based on the stream of fulfillment data, to be implemented, (ii) causing natural conversation output to be audibly rendered for presentation to the user, or (iii) refraining from causing any interaction to be implemented, based on the current state of the stream of NLU output, the stream of fulfillment data, and the audio-based characteristics associated with one or more of the spoken utterances comprises:
   processing, using a classification machine learning (ML) model, the current state of the stream of NLU output, the stream of fulfillment data, and the audio-based characteristics to generate corresponding predicted response measures associated with each of (i) causing fulfillment output, that is generated based on the stream of fulfillment data, to be implemented, (ii) causing natural conversation output to be audibly rendered for presentation to the user, and (iii) refraining from causing any interaction to be implemented; and
   determining, based on the corresponding predicted response measures, whether the next interaction state to be implemented is to (i) causing fulfillment output, that is generated based on the stream of fulfillment data, to be implemented, (ii) causing natural conversation output to be audibly rendered for presentation to the user, or (iii) refraining from causing any interaction to be implemented.

3. The method of claim 1, wherein determining the multiple candidate given fulfillment outputs that are predicted to satisfy the one or more spoken utterances of the user based on the stream of fulfillment data comprises:
   determining, based on the stream of fulfillment data, a set of fulfillment outputs; and
   selecting, based on predicted NLU measures associated with the stream of NLU output and/or predicted fulfillment measures associated with the stream of fulfillment data, the multiple candidate given fulfillment outputs from among the set of fulfillment outputs.

4. The method of claim 3, wherein selecting the multiple candidate given fulfillment outputs from among the set of fulfillment outputs based on the predicted NLU measures associated with the stream of NLU output and/or the predicted fulfillment measures associated with the stream of fulfillment data comprises:
   selecting the first candidate given fulfillment output, from among the set of fulfillment outputs, for initiating the corresponding partial fulfillment in response to determining the predicted NLU measures associated with the stream of NLU output and/or the predicted fulfillment measures associated with the stream of fulfillment data satisfy both a first threshold measure and a second threshold measure.

5. The method of claim 4, wherein selecting the multiple candidate given fulfillment outputs from among the set of fulfillment outputs based on the predicted NLU measures associated with the stream of NLU output and/or the predicted fulfillment measures associated with the stream of fulfillment data further comprises:
- selecting the second candidate given fulfillment output, from among the set of fulfillment outputs, for initiating the corresponding partial fulfillment in response to determining the predicted NLU measures associated with the stream of NLU output and/or the predicted fulfillment measures associated with the stream of fulfillment data satisfy the first threshold measure, but not the second threshold measure,
  - wherein the second candidate given fulfillment output differs from the first candidate given fulfillment output.

6. The method of claim 3, wherein determining the set of fulfillment outputs based on the stream of fulfillment data comprises:
- processing, using a plurality of first-party agents, the fulfillment data to generate corresponding first-party fulfillment output; and
- incorporating the corresponding first-party fulfillment output into the set of fulfillment outputs.

7. The method of claim 6, wherein determining the set of fulfillment outputs based on the stream of fulfillment data further comprises:
- transmitting, over one or more networks, the fulfillment data from the client device to one or more third-party systems, wherein transmitting the fulfillment data to the one or more third-party systems causes each of the third-party systems to process, using a corresponding third-party agent, the fulfillment data to generate corresponding third-party fulfillment output;
- receiving, over one or more of the networks, the corresponding third-party fulfillment outputs, at the client device and from the one or more third-party systems; and
- incorporating the corresponding third-party fulfillment output generated using the plurality of first-party agents into the set of fulfillment outputs.

8. The method of claim 1, wherein the given fulfillment output to be implemented comprises one or more of:
- synthesized speech audio data that includes synthesized speech corresponding to the given fulfillment output to be audibly rendered for presentation to the user via one or more speakers of the client device,
- graphical content corresponding to the given fulfillment output to be visually rendered for presentation to the user via a display of the client device or an additional client device in communication with the client device, or
- an assistant command corresponding to the given fulfillment output that, when executed, causes the automated assistant to control the client device or an additional client device in communication with the client device.

9. The method of claim 1, further comprising:
- maintaining, in one or more databases accessible by the client device, a set of natural conversation outputs; and
- selecting, based on at least the audio-based characteristics associated with one or more of the spoken utterances, the natural conversation output from among the set of natural conversation outputs.

10. The method of claim 9, wherein selecting the natural conversation output from among the set of the natural conversation outputs is in response to determining the next interaction state to be implemented is (ii) causing natural conversation output to be audibly rendered for presentation to the user, and wherein selecting the natural conversation output from among the set of natural conversation outputs comprises:
- selecting a first natural conversation output, from among the set of natural conversation outputs, as the natural conversation output based on predicted measures associated with the NLU output and the audio-based characteristics associated with one or more of the spoken utterances.

11. The method of claim 10, and wherein selecting the natural conversation output from among the set of natural conversation outputs further comprises:
- selecting a second natural conversation output, from among the set of natural conversation outputs, as the natural conversation output based on the predicted measures associated with the NLU output and the audio-based characteristics associated with one or more of the spoken utterances,
  - wherein the second natural conversation output differs from the first natural conversation output.

12. The method of claim 1, further comprising:
- in response to determining the next interaction state to be implemented is (iii) refraining from causing any interaction to be implemented:
  - processing, using a voice activity detection model, the stream of audio data to monitor for an occurrence of voice activity; and
- in response to detecting the occurrence of voice activity:
  - determining whether the occurrence of voice activity is directed to the automated assistant.

13. The method of claim 12, wherein determining whether the occurrence of voice activity is directed to the automated assistant comprises:
- processing, using the ASR model, the stream of audio data to continue generating the stream of ASR output;
- processing, using the NLU model, the stream of ASR output, to continue generating the stream of NLU output; and
- determining, based on the stream of NLU output, whether the occurrence of voice activity is directed to the automated assistant.

14. The method of claim 13, further comprising:
- in response to determining that the occurrence of voice activity is directed to the automated assistant:
  - continue generating, based on the stream of NLU output, the stream of fulfillment data; and
  - updating, based on the stream of fulfillment data, a set of fulfillment outputs from which the given fulfillment output to be implemented is selected.

15. The method of claim 13, further comprising:
- in response to determining that the occurrence of voice activity is not directed to the automated assistant:
  - determining whether a threshold duration of time has lapsed since the user provided the one or more spoken utterances; and
  - in response to determining the threshold duration of time has lapsed since the user provided the one or more spoken utterances:
    - determining the next interaction state to be implemented is (ii) causing natural conversation output to be audibly rendered for presentation to the user.

16. The method of claim 15, wherein the natural conversation output to be audibly rendered for presentation to the user via one or more speakers of the client device comprises one or more of:

an indication of a desire whether to continue interacting with the automated assistant; or a request that the user provide additional user input in furtherance of a dialog session between the user and the automated assistant.

17. A system comprising:

at least one processor; and memory storing instructions that, when executed, cause the at least one processor to:

processing, using an automatic speech recognition (ASR) model, a stream of audio data to generate a stream of ASR output, the stream of audio data being generated by one or more microphones of a client device, and the stream of audio data capturing one or more spoken utterances of a user that are directed to an automated assistant implemented at least in part at the client device;

process, using a natural language understanding (NLU) model, the stream of ASR output, to generate a stream of NLU output;

generate, based on the stream of NLU output, a stream of fulfillment data;

determine, based on processing the stream of audio data, audio-based characteristics associated with one or more of the spoken utterances;

determine, based on a current state of the stream of NLU output, the stream of fulfillment data, and the audio-based characteristics associated with one or more of the spoken utterances, whether a next interaction state to be implemented is:

(i) causing fulfillment output, that is generated based on the stream of fulfillment data, to be implemented, (ii) cause natural conversation output to be audibly rendered for presentation to the user, or (iii) refrain from causing any interaction state to be implemented; and prior to determining the next interaction state to be implemented:

determine, based on the stream of fulfillment data, multiple candidate given fulfillment outputs that are predicted to satisfy the one or more spoken utterances of the user; and as the user continues to provide the one or more spoken utterances:

initiate, for each of the multiple candidate given fulfillment outputs, corresponding partial fulfillment, wherein the corresponding partial fulfillment for the multiple candidate given fulfillment outputs comprises at least:

for a first candidate given fulfillment output, from among the multiple candidate given fulfillment outputs, establishing a corresponding connection with one of: a given software application that is accessible by the client device, a given first-party agent, a given third-party agent, or a given additional client device that is in addition to the client device; and for a second candidate given fulfillment output, from among the multiple candidate given fulfillment outputs, establishing a corresponding connection with another one of: the given software application that is accessible by the client device, the given first-party agent, the given third-party agent, or the given additional client device that is in addition to the client device generate, based on the stream of NLU output, an update stream of fulfillment data; and determine, based on the updated stream of fulfillment data, a given fulfillment output, from among the multiple candidate given fulfillment outputs, to be implemented; and in response to determining the next interaction state to be implemented:

cause the next interaction state to be implemented.

18. A non-transitory computer-readable storage medium storing instructions that, when executed by at least one processor, cause the at least one processor to be operable to perform operations, the operations comprising:

processing, using an automatic speech recognition (ASR) model, a stream of audio data to generate a stream of ASR output, the stream of audio data being generated by one or more microphones of a client device, and the stream of audio data capturing one or more spoken utterances of a user that are directed to an automated assistant implemented at least in part at the client device;

processing, using a natural language understanding (NLU) model, the stream of ASR output, to generate a stream of NLU output;

generating, based on the stream of NLU output, a stream of fulfillment data;

determining, based on processing the stream of audio data, audio-based characteristics associated with one or more of the spoken utterances;

determining, based on a current state of the stream of NLU output, the stream of fulfillment data, and the audio-based characteristics associated with one or more of the spoken utterances, whether a next interaction state to be implemented is:

(i) causing fulfillment output, that is generated based on the stream of fulfillment data, to be implemented, (ii) causing natural conversation output to be audibly rendered for presentation to the user, or (iii) refraining from causing any interaction state to be implemented;

prior to determining the next interaction state to be implemented:

determining, based on the stream of fulfillment data, multiple candidate given fulfillment outputs that are predicted to satisfy the one or more spoken utterances of the user; and as the user continues to provide the one or more spoken utterances:

initiating, for each of the multiple candidate given fulfillment outputs, corresponding partial fulfillment, wherein the corresponding partial fulfillment for the multiple candidate given fulfillment outputs comprises at least:

for a first candidate given fulfillment output, from among the multiple candidate given fulfillment outputs, establishing a corresponding connection with one of: a given software application that is accessible by the client device, a given first-party agent, a given third-party agent, or a given additional client device that is in addition to the client device; and for a second candidate given fulfillment output, from among the multiple candidate given fulfillment outputs. establishing a corresponding connection with another one of: the given software application that is accessible by the client device, the given first-party agent, the given third-party agent, or the given additional client device that is in addition to the client device;
generating, based on the stream of NLU output, an update stream of fulfillment data; and
determining, based on the updated stream of fulfillment data, a given fulfillment output, from among the multiple candidate given fulfillment outputs, to be implemented; and
in response to determining the next interaction state to be implemented:
causing the next interaction state to be implemented.

* * * * *